INVENTORS
GEORGE F. JANAUSHEK
SUM F. TSE
BY
G. R. Gugger
AGENT

Aug. 14, 1956  G. F. JANAUSHEK ET AL  2,758,537
RECORD CONTROLLED MACHINE
Filed May 2, 1955  13 Sheets-Sheet 2

INVENTORS
GEORGE F. JANAUSHEK
SUM F. TSE
BY
G. R. Gugger
AGENT

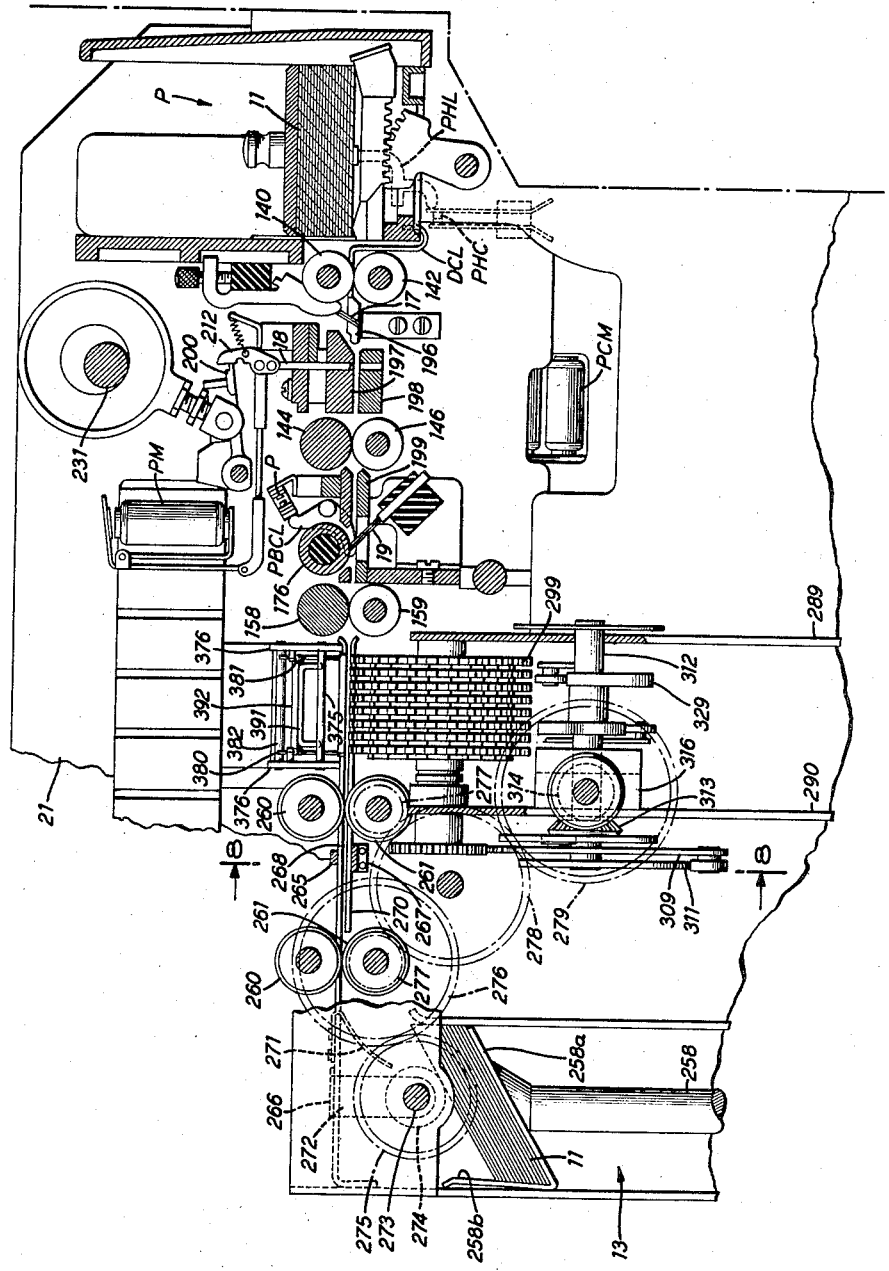

Aug. 14, 1956  G. F. JANAUSHEK ET AL  2,758,537
RECORD CONTROLLED MACHINE
Filed May 2, 1955  13 Sheets—Sheet 4

INVENTORS
GEORGE F. JANAUSHEK
SUM F. TSE
BY
G. R. Gugger
AGENT

INVENTORS
GEORGE F. JANAUSHEK
SUM F. TSE
BY
*G. R. Gugger*
AGENT.

INVENTORS
GEORGE F. JANAUSHEK
SUM F. TSE

Aug. 14, 1956

G. F. JANAUSHEK ET AL 2,758,537

RECORD CONTROLLED MACHINE

Filed May 2, 1955

INVENTORS
GEORGE F. JANAUSHEK
SUM F. TSE

BY

*G. R. Gugger*

AGENT

Aug. 14, 1956
G. F. JANAUSHEK ET AL
2,758,537
RECORD CONTROLLED MACHINE
Filed May 2, 1955
13 Sheets-Sheet 8

INVENTORS
GEORGE F. JANAUSHEK
SUM F. TSE
AGENT

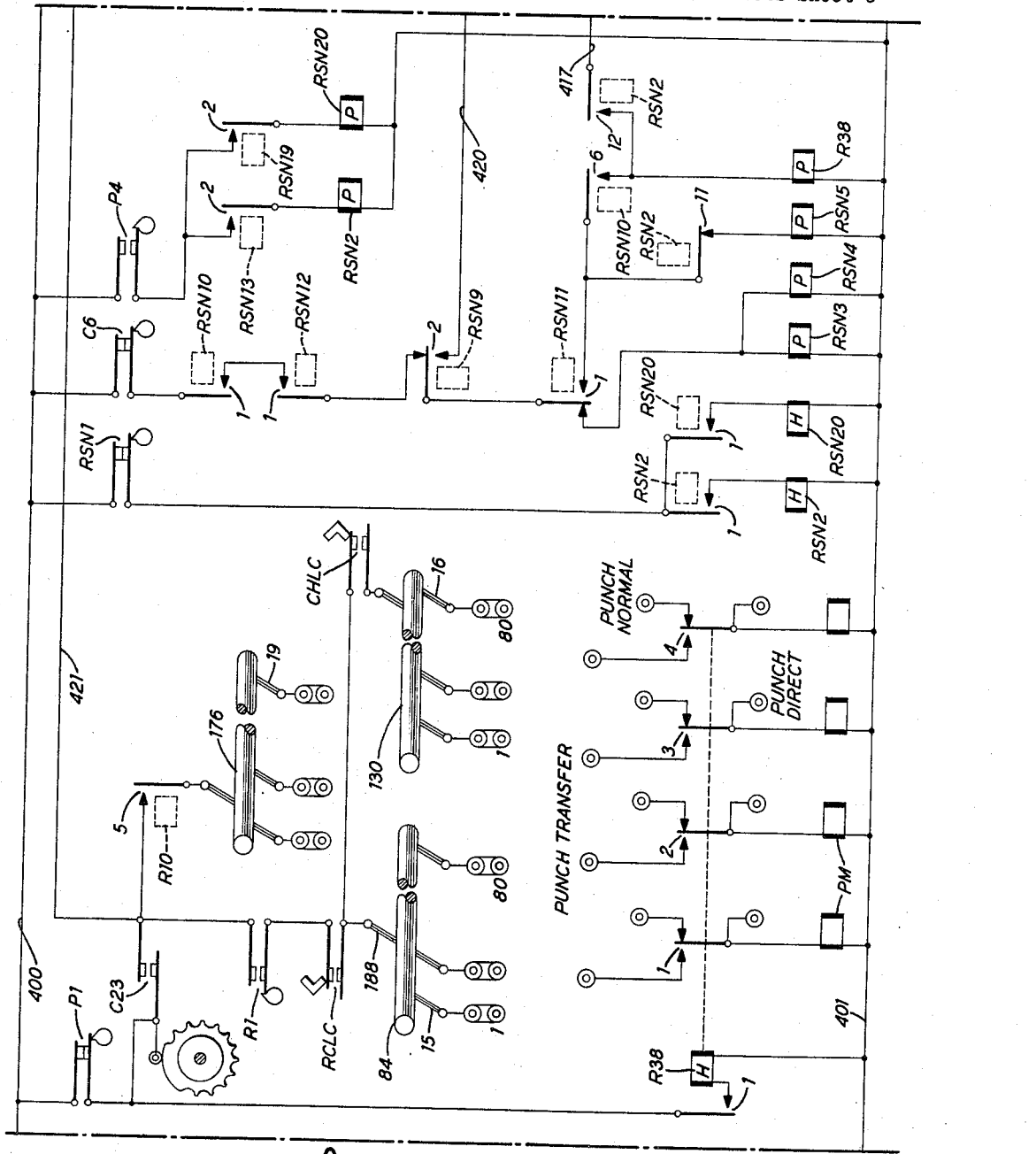
FIG._11b

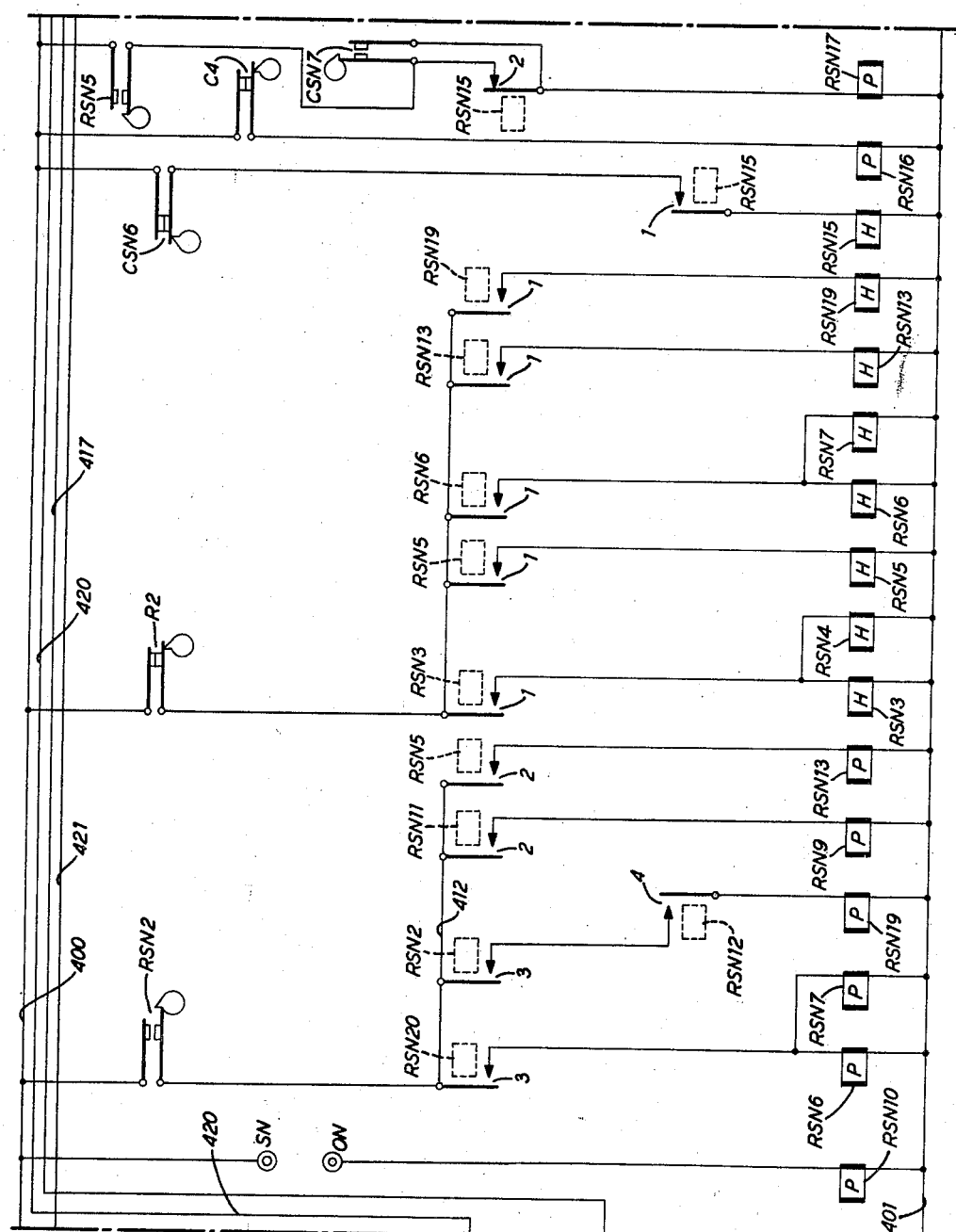

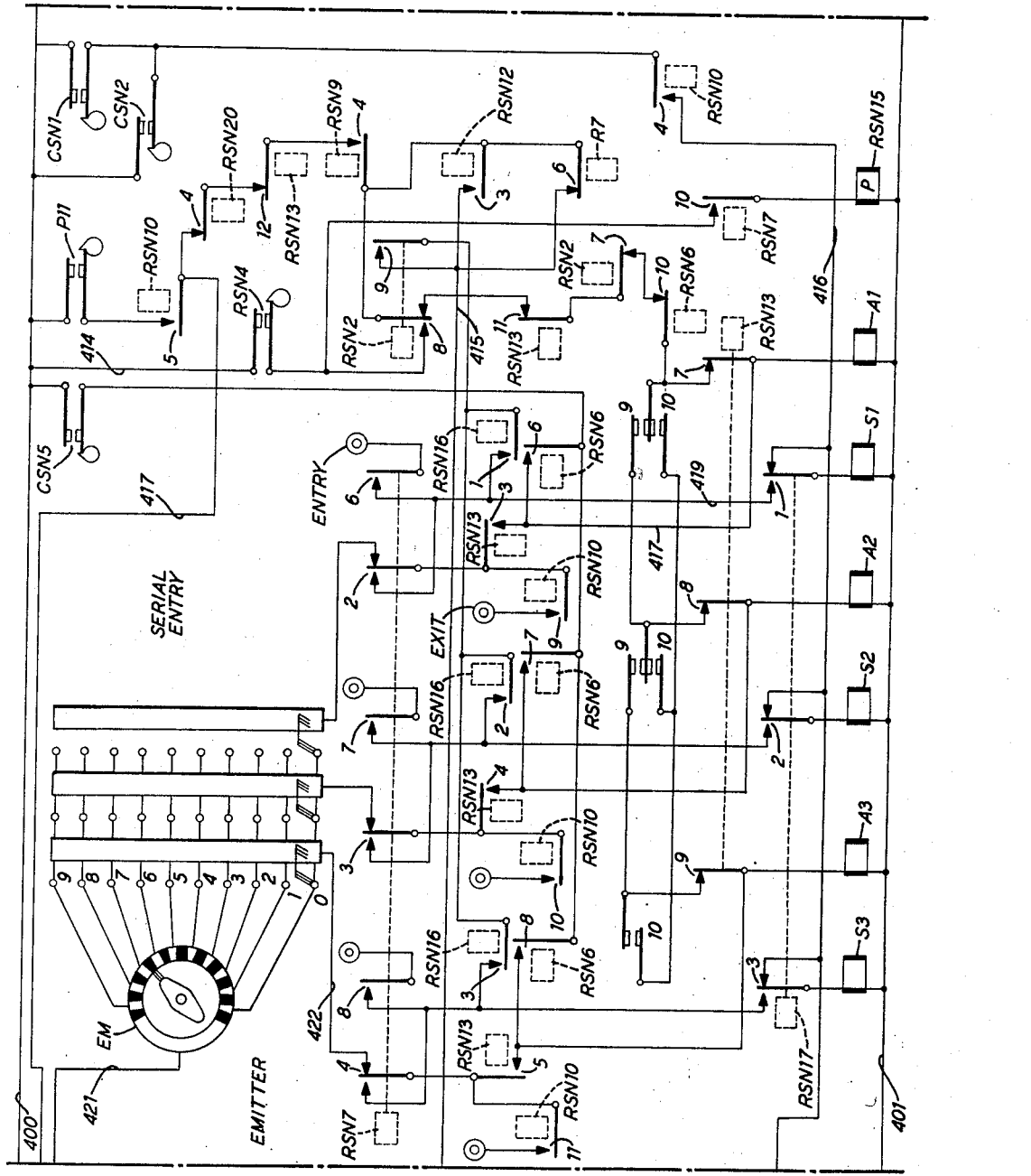

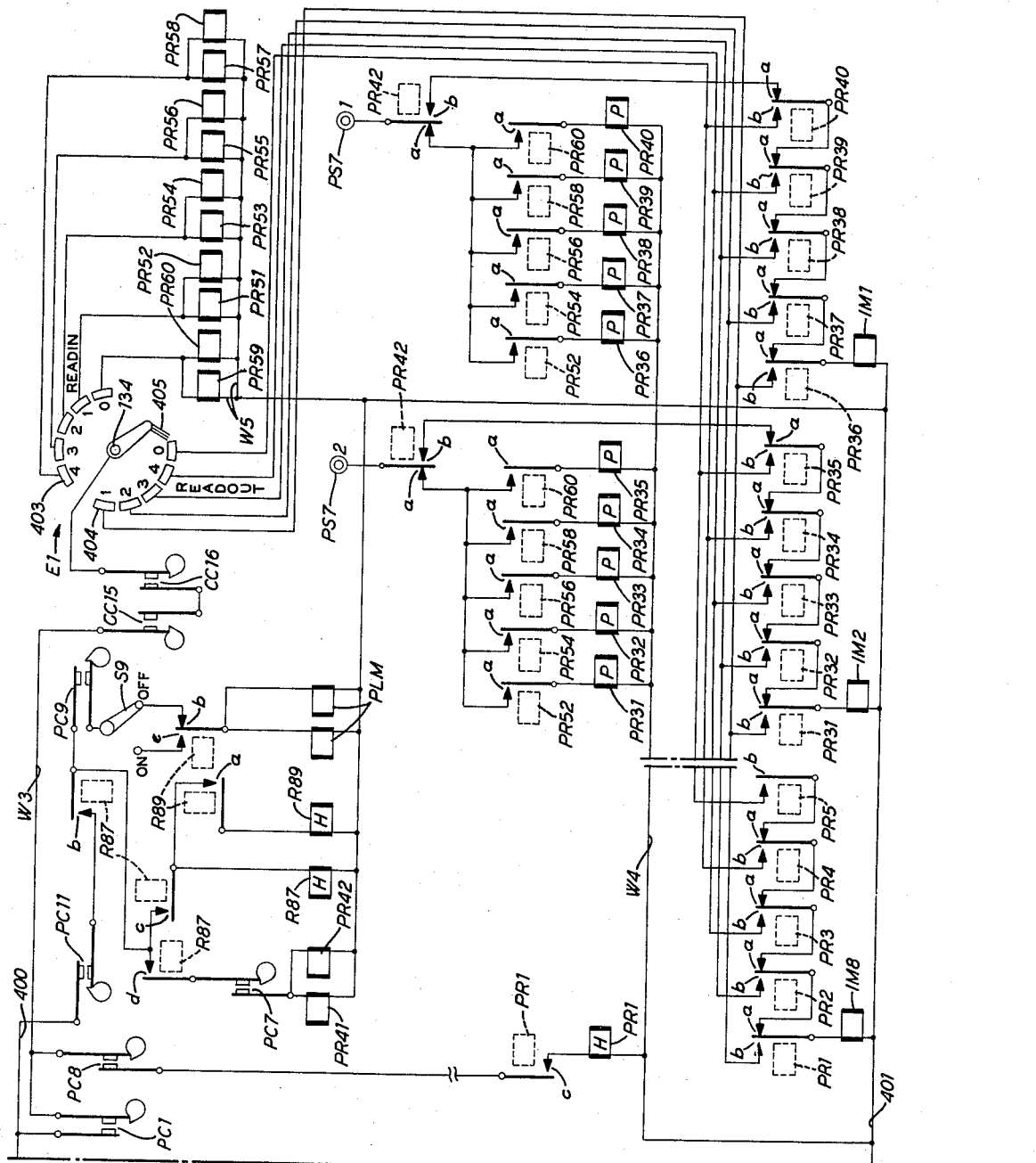

United States Patent Office 2,758,537
Patented Aug. 14, 1956

2,758,537

RECORD CONTROLLED MACHINE

George F. Janaushek and Sum F. Tse, Endicott, N. Y., assignors to International Business Machines Corporation, New York, N. Y., a corporation of New York Application May 2, 1955, Serial No. 505,195

8 Claims. (Cl. 101—19)

This invention relates to record controlled machines, particularly to that type commercially known as a reproducer wherein suitable card perforating mechanism is arranged to gang punch records with data designating perforations and capable of utilizing one punched accounting and statistical record card to produce another such card by reproducing the first card wholly or in part. A record controlled machine of this type is disclosed in Patent Re. 21,133, which discloses the structure of the well-known "IBM" High Speed Reproducer, and also in Patents 2,448,781 and 2,531,873 which disclose said high speed reproducer having the added facility of being able to end print on the record cards. The present invention, solely as a convenience in disclosure of the invention, has been shown in the drawings and will be described hereinafter as applied to machines of this type.

The present invention consists of an improvement enabling groups of cards to be gang punched and serially number printed under control of related groups of master cards.

The present invention has found use in the unit inventory type of billing file which is particularly adaptable to the wholesale distribution industry where sales are made in standard packaged units. In this type of file, the IBM card as a unit record represents a unit of stock or merchandise.

A master file record card is established for each merchandise item and punched with such information as selling price, cost, weight, location, stock number and description. Also, a trailer card would be prepared for each item prepunched with quantity and starting serial number information. Processing these cards through the high speed reproducer, it is possible to provide unit inventory cards which are automatically gang punched from the master file record and serial number end printed under control of the trailer card. Thus, as the unit cards are withdrawn from or inserted in the files in strict serial number sequence, the inventory count for each item can be ascertained by simple reference to the serial numbers on the cards.

It is sometimes impractical to put all of the prepunched information in the master file record because frequent changes in location, for example, would require discarding all of the prepunched information on the master file record. As a result it has been found desirable to prepunch a second master card with only the location information or whatever varying type of information might be involved. With this arrangement it becomes necessary to prepare the unit inventory cards from two master cards and one trailer card instead of one master card and one trailer card. Prior art reproducing machines have been limited to serial number printing and gang punching groups of cards under control of either a single master card or one master card and one trailer card.

Accordingly, a more specific object of the present invention is to provide means for gang punching and serial number printing groups of unit inventory or detail cards under control of related groups of cards comprising at least two master cards and one trailer card per group.

A further object of the present invention is to provide means under control of the first run-in cycle of machine operation for automatically conditioning the machine for reproducing during the second and third cycles of machine operation and for gang punching during the fourth and succeeding cycles of machine operation.

A further object of the present invention is to provide means operative when the machine is conditioned for serial number printing to automatically cause the read feed to take an extra cycle of operation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2b is a sectional elevation view of the perforating side of the machine showing the feeding, sensing, perforating and end printing devices.

Figs. 11a to 11f comprise a wiring diagram.

*Punching machine*

Figure 1:
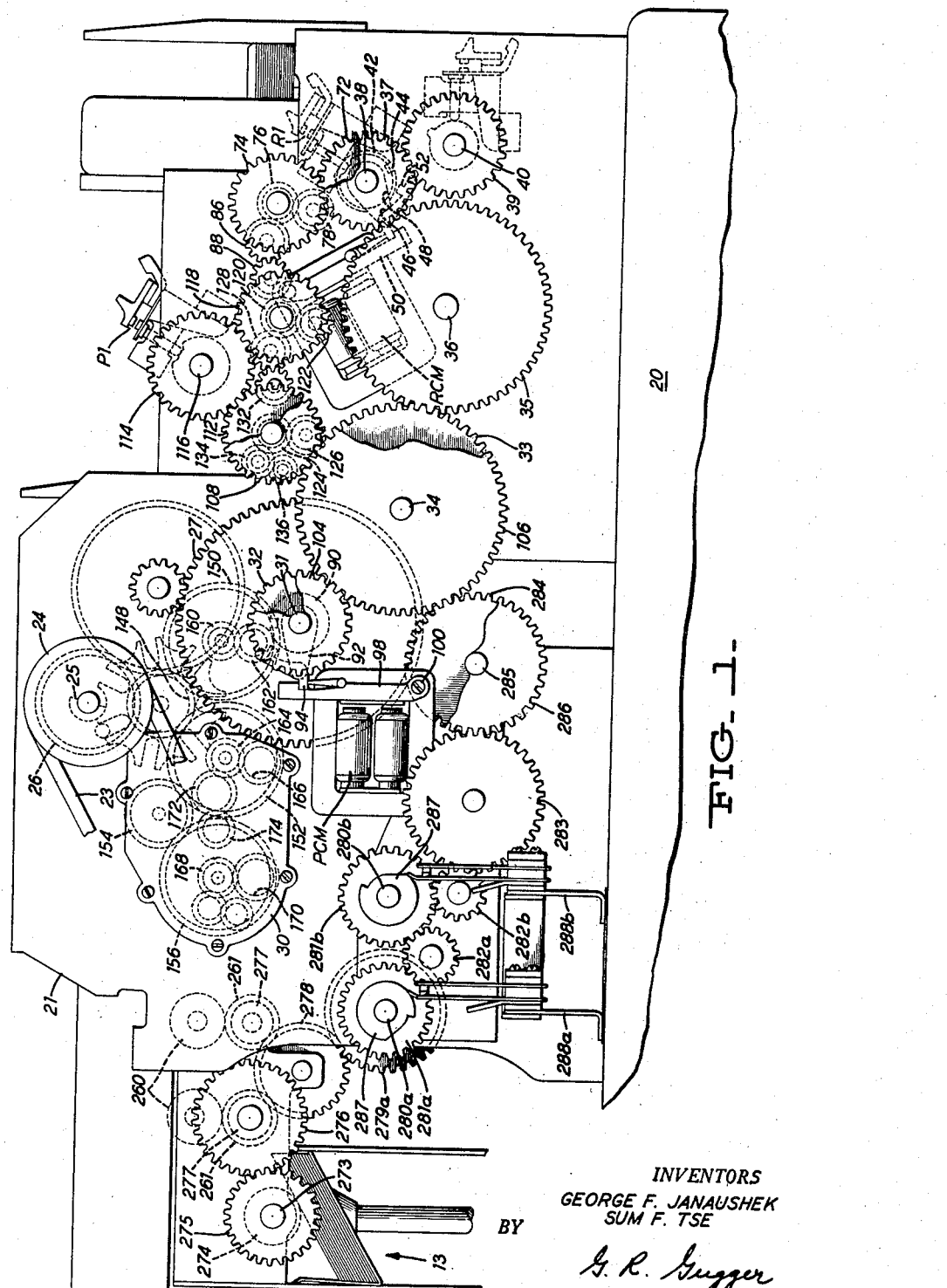
Fig. 1 is a side elevation of the machine.
Figure 2A:
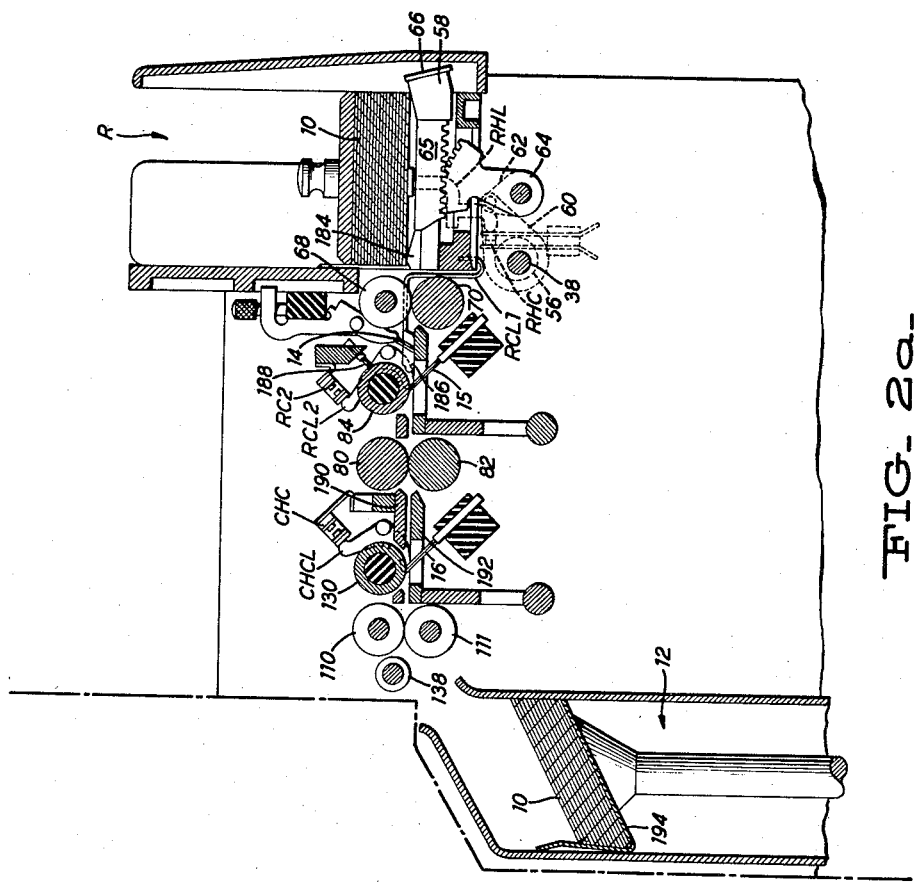
Fig. 2a is a sectional elevation view of the read side of the machine showing the feeding and sensing devices.

Referring now to the drawings in detail, the essential working parts of a high speed reproducing perforating machine constructed according to the principles set forth in Patents Re. 21,133 and 2,531,873 are shown in Figs. 1, 2a and 2b. Reference may be had to these patents for a full and comprehensive understanding of the various machine parts and functions thereof, as well as of the operation of the device as a whole. Briefly, however, and for the purpose of illustration in connection with the present invention, a number of master cards 10 (Figs. 2a, 2b) are contained in a hopper R and an additional group of blank, record or detail cards 11 are contained in a hopper P. The cards are fed singly and concurrently from both hoppers and are then shifted in synchronism through sensing, punching and printing stations before being deposited in stackers 12 and 13.

Upon leaving the hopper R, each master card 10 first encounters a master sensing brush 14, then a line of sensing brushes 15, and finally a series of checking brushes 16. The detail cards 11 upon leaving the hopper P each pass a master sensing brush 17, then a line of punches 18, a set of checking brushes 19 and finally a line of print wheels 299. The brush 14 cooperates with a special perforation in the original or master card 10 and when such a perforation is sensed a class selection operation may take place to shift the sensed data to a selected field on the record or detail card. The brush 17 is used for field selection of gang punching and also for control of suspension of master card feeding when the machine is conditioned for combined gang punching and reproducing.

Electrical connections exist between the line of brushes 15 and the line of punches 18 so that when a perforation is sensed in a master card 10, a perforation is punched in the related detail card 11 in a corresponding position. After the cards have passed the first sensing and punching stations respectively, they enter separate checking stations. In these stations the master card 10 is sensed by the checking brushes 16 at the same time that the related detail card is sensed by the checking brushes 19. If the perforations in both cards do not agree, the machine is stopped and a lamp or other signal (not shown) indicates the error.

Where straight gang punching operations are concerned, the hopper R is not used and only that section of the machine to the left of the hopper P is employed. A previously punched master card is placed at the bottom of the hopper P and from there it is fed under the punches 18 and over to the brushes 19. For gang punching operations these latter brushes have a function other than checking. They are electrically connected to the punches 18 and when a perforation is sensed in a master card or a detail card following thereafter, the next following detail card is perforated by the punches 18 to duplicate the data appearing on the preceding card. In this manner an entire group or stack of cards 11 may be gang punched under the control of the single leading master card. Where gang punching operations are performed successively upon different groups of cards, a number of master cards are interspersed in the detail record cards in the hopper P. The following operations are substantially the same as with a single group, the only difference in operation being that when an interspersed master card passes under the punches 18 such a card is not punched under the control of its preceding card 11 at the end of the preceding group. For this purpose, the master sensing brush 17 is adapted to sense special perforations appearing in the master cards and prevent punching until the master card is situated in registry with the checking brushes 19.

For combined reproducing and gang punching operations, both sections of the machine are used. The cards 11 are operated upon as previously described, the only difference being that a number of the punches 18 are controlled by the master card 10 and brushes 15, while the others of the punches 18 are controlled by the gang punching master card and brushes 19. In such an instance, only certain of the brushes 16 and 19 are used for checking purposes.

Referring now to Figs. 1, 2a and 2b wherein the driving connections of the machine are shown, a motor M (not shown) is mounted above the base 20 of the machine which also carries a pair of main side frames 21. The motor is connected by a driving belt 23 to a pulley 24 on a shaft 25 suitably mounted in bearings in the frames 21. Fixed to the shaft 25 is a gear 26 which serves to drive all of the continuously running instrumentalities of the machine. Suitable gearing designated in its entirety at 30 extends between the driving gear 26 and a relatively large punch clutch driving gear 27 which is pivoted on a punch feed drive shaft 31 and attached to another driving gear 32. Gear connections are provided between the punch clutch under the hopper P and another clutch under the hopper R so that cards may be fed in synchronism from both hoppers. The gear 32 meshes with another gear 33 pivoted as at 34. This gear 33 in turn meshes with a similar gear 35 pivoted as at 36. The gear 35 meshes with a reproducer clutch driving gear 37 mounted on a shaft 38. The gear 37 meshes with a gear 39 secured to a shaft 40 and thus this latter shaft is given a continuous movement. It serves as a mounting for a number of cams cooperating with a series of cam contacts C1, C2, C4, C6 and CSN1—CSN7 hereinafter referred to, and also as a mounting for an impulse distributor wheel which constitutes an actuating device for a pair of contacts C23, the function of which will be set forth fully hereinafter.

The gear 37 (Fig. 1) has secured thereto a clutch disc 42 provided with a notch 44. Cooperating with the notch 44 is a pawl 46 mounted on an arm 48 attached to the shaft 38. One end of the pawl is engaged by an armature latch 50 and the other end of the pawl is formed with an extension 52 adapted to fall into the notch 44. A suitable spring (not shown) normally holds the armature latch 50 in engagement with the pawl 46, but when an associated magnet RCM is energized the latch is moved away from the pawl, thus connecting the shaft 38 to the driving gear 37. Shaft 38 carries a series of cams by means of which cam contacts R1, R2 and RSN1—RSN5 are operated.

The shaft 38 is provided with an eccentric 56 (Fig. 2a) for operating card feed picker slides 58. Encircling the eccentric is a strap 60 which receives a reciprocating motion for each rotation of the shaft 38. The strap 60 is formed with an ear pivotally attached to an arm 62 which also carries a pair of gear sectors 64. The sectors 64 mesh with racks 65 provided on the bottom of the picker slides 58 and form a driving connection therewith. The slides 58 carry a projecting picker knife 66 which is adapted to engage the bottom card in the hopper R. It is apparent from the above described connections for the reproducer clutch that when the magnet RCM is energized the picker knife 66 is moved to the right, thus bringing the bottom master card 10 in the hopper R into cooperation with a pair of feeding rollers 68 and 70. Such a feeding action occurs during each cycle of operation when the machine is employed for straight reproducing.

The feeding rollers 68 and 70 are driven by a gear 72 (Fig. 1) mounted on the shaft 38 and in mesh with a gear 74 carried on the roller 68. A smaller gear 76 on the roller 68 cooperates with a similar gear 78 on the roller 70 so that both rollers are turned simultaneously but oppositely. The rollers 68 and 70 extend across the machine between the side frames 21 and the roller 68 is slotted at various column positions to permit proper placement of the master brush 14 in any desired position. These rollers, when turning, draw a card from beneath the hopper R and feed it to the left between the brushes 14 and 15 and over into other feeding rollers 80 and 82.

A contact roller 84 is associated with the brushes 15 and is driven by gear connections from the feed roller 68, the gear 76 on the roller 68 meshing with an idler gear 86 which, in turn, meshes with a gear 88 on the contact roller 84.

The punch clutch under the hopper P is operated when connections are established between the punch feed drive shaft 31 and the punch clutch driving gear 27. Attached to the gears 27 and 32 is a notched disc 90 which is loosely mounted on the shaft 31. Adjacent the disc 90 is an arm 92 fixed to the shaft 31 and carrying a clutch pawl 94 which is pivoted thereon. The pawl has an extension adapted to fit into the notch in the disc 90 and is normally urged into engagement with the disc by a suitable spring (not shown). However, the pawl is held disengaged by an armature latch 98 which engages an extending arm on the pawl. When the punch clutch magnet PCM is energized, the associated armature is attracted and the latch 98 is rocked to the left about a pivot 100, thus releasing the pawl 94 and connecting the shaft 31 to the driving gears.

When the shaft 31 is operated, certain driving connections are rendered operative to actuate a card picker mechanism under the hopper P, which is similar to the previously described card picker mechanism under the hopper R and which is generally designated by the reference character 102. Additionally, a driving connection exists between the shaft 31 and the checking station feed rollers. A third driving connection exists between the shaft 31 and operates to release a clutch connection in a Geneva gear drive whereby intermittent motion of the card is brought about as previously described. These driving connections are not fully disclosed in the accompanying drawings, but reference may be had to the patents previously mentioned for a full disclosure thereof.

A gear 104 mounted on the shaft 31 meshes with a gear 106 mounted on the same stud 34 with the gear 33. The gear 106 meshes with a gear 108 attached to a feed roller 110. Another gear 112 on the feed roller 110 meshes with a gear 114 attached to a shaft 116 which carries a series of cams by means of which the cam contacts P1—P11, are operated. The gear 114 meshes with a gear 118 attached to the feed roller 80 which also carries a small gear 120 in mesh with a similar gear 122 on the associated roller 82. A small gear 124 on the roller 110 drives a similar gear 126 on an associated roller 111. An idler gear 128 meshes with the gear 120 and drives a contact roller 130 through a gear 132 mounted thereon. Another idler gear 134 meshes with the gear 124 and serves to drive a pinion 136 mounted on a card deflecting eject roller 138.

A plurality of punch feeding rollers 140, 142, 144 and 146 are suitably geared and are driven from the driving gear 26 for feeding cards under the punch plungers 18. Suitable connections also extend from the gear 26 to the Geneva drive, previously referred to, for applying intermittent movement to the cards passing through the punching station. These driving connections are fully disclosed in the previously mentioned patent.

The connection just referred to for the Geneva drive mechanism includes a clutch between the Geneva gear wheel proper and the feed rollers so that feeding may be prevented when cards are not to be punched. The clutch mechanism is so designed that if the magnet PCM is not energized there is no driving connection to the Geneva wheel arrangement, and if this latter magnet is energized the usual driving connection is existent. A gear 148 meshes with two gears 150 and 152 on the feed rollers 140 and 144 respectively. An idler gear 154 between the gear 152 and another gear 156 forms the driving connections over to a feed roller 158 on which the gear 156 is mounted. A small gear 160 on the roller 140 cooperates with a similar gear 162 on the roller 142. The same sort of gear connection is made between a pair of gears 164 and 166 on the rollers 144 and 146 and between gears 168 and 170 on the roller 158 and its associated roller 159. An idler gear 172 connects the gear 164 to a gear 174 on a contact roller 176.

The punch side of the machine is provided with a pocket 13 (Figs. 1 and 2b) which has a vertically moving card platform 258 spring urged upwardly and provided with a platform plate 258a which slants downwardly from right to left. Between this pocket and the feed rollers 158, 159, are provided two pairs of feed rollers 260, 261 rotatably mounted in the side frame 21 of the machine.

The side frames are joined together by three cross-bars 265, 266, 267 (Fig. 2b). The cross-bars 265, 266 support an upper card guide 268 which extends from the pocket 13 to a point just to the left of the feed rollers 158, 159. The bar 267 also supports a shorter guide 270 similar to the guide 268 so that a card fed by the rollers 158, 159 will pass between the guides 268, 270 in its progress toward the pocket 13. The guide 268 is provided with a large hole through which projects a card deflector 271. This deflects cards fed by the left-hand pair of feed rollers 260, 261 downwardly on top of the cards on the plate 258a.

Journaled in the rear side frame and in a bracket 272 secured to the underside of the cross-bar 266 is a shaft 273 provided with stacker rollers 274. Springs which operate the card platform 258a lightly press the platform plate 258a and the cards which may have been deposited thereon up against the rollers 274. When a card is discharged from the rollers 260, 261 it is gripped by the rollers 274 and pushed downwardly to the left against the upturned portion 258b of the platform plate.

The rollers 260, 261, the stacker rollers 274 and the printing mechanism are driven by a train of gears from the gear 138. Secured to the shaft 273 is a gear 275 (Figs. 1 and 2b) which meshes with a larger gear 276 secured to the shaft of the left-hand feed roller 261. A smaller gear 277 on the same feed roller 261 meshes with a larger idler gear 278 and the gear 278 meshes with another small gear 277 on the other feed roller 261. The idler gear 278 also meshes with a gear 279 on a cam shaft 280a which has a gear 281a. The gear 281a is connected to the gear 138 by a train of gears which comprises a gear 281b on a second cam shaft 280b; idler gears 282a, 282b and 283; a gear 284 on a shaft 285, and a gear 286 on shaft 285, the latter meshing directly with gear 138. It will be remembered that the gear 138 turns only when the punch clutch 136 controlled by magnet PCM is engaged.

Secured to cam shafts 280a, 280b is a number of cams 287 operating contacts designated PC1 to PC11. These contacts are insulatably mounted on brackets 288a, 288b secured to the base of the machine. The cam shaft 280a also drives the printing mechanism which operates only when the punch mechanism is in operation.

Figure 11A:
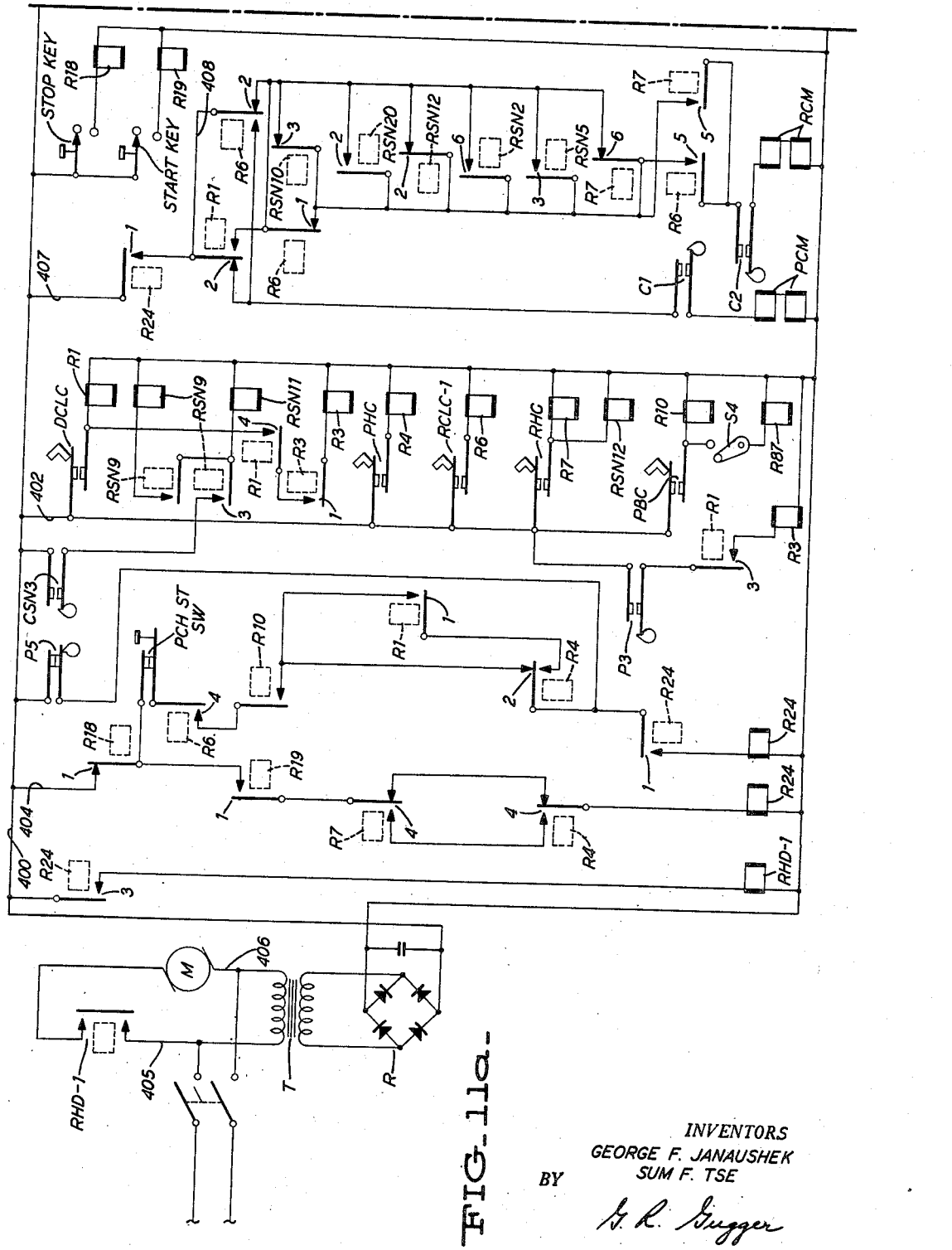

In the operation of the perforating machine, when a group of master cards 10 are placed in the hopper R, the bottom card depresses a hopper contact lever RHL closing the associated contacts RHC of Fig. 11a. Subsequently, when the picker mechanism is operated the bottom card alone is forced through the throat 184 and placed between the feed rollers 68 and 70 which feed the card along the machine.

Upon entering the sensing station, the card engages and operates a card lever RCL1. At the same time the card passes between the brush 14 and a contact plate 186. From there the card passes between the brushes 15 and the contact roller 84, and at the same time operates a card lever RCL2. Common contact brushes 188 carry the sensing current to the roller 84. The brushes 15 are arranged in a single line.

The card passes on to the feed rollers 80 and 82, which feed it between a pair of guide plates 190 and 192. A card lever CHCL is operated as the card passes between the checking brushes 16 and contact roller 130. After leaving the brushes 16, the card is engaged by the rollers 110 and 111 which serve to eject the card to the stacker 12 wherein the cars are supported on the top of a depressible spring plunger 194.

The brush 14 is adjustable along the length of the card in order that it may cooperate with any column therein.

The detail cards 11 and any master cards 10 which may be placed in the hopper P follow a course through punching and sensing stations before being deposited in the stacker 13. The cards in this hopper depress the hopper contact lever PHL and close the associated contacts PHC (Fig. 11a). Upon operation of the picker mechanism 102, the bottom card passes through a throat 195 and is placed between the feed rollers 140 and 142 which feed the card along between the brush 17 and contact bar 196. As the card passes, it operates a card lever DCL. The brush 17 is adjustable in the same manner as the brush 14. After leaving the master card sensing station, the card is fed between a stripper plate 197 and die plate 198 and enters between the feed rollers 144 and 146, which latter rollers feed it between guide plates 199. A card lever PBCL is operated as the card passes between the sensing brushes 19 and contact rollers 176. An insulation block holds contact brushes 19 in contact with the roller 176. When the card leaves the brushes it is engaged by the rollers 158 and 159 which feed it past the printing station after which rollers 260, 261 take over to feed the card to the stacker 13.

The selective operation of the punch plungers, by means of mechanism designated in its entirety at 200, is fully set forth in the previously mentioned patent and reference should be had thereto for an understanding thereof. It is deemed sufficient to state that the operation of punching is timed to occur during the pause in card feeding when the Geneva drive wheel mechanism is not in action.

Accumulator devices

As was previously mentioned, the present device serially number prints groups of gang punched cards with the starting serial number of each group being printed under control of a serial number counter. The number of detail cards that are printed for each group is controlled by a quantity counter into which quantity punchings from each trailer card are entered. The serial number counter and quantity counter each comprise a plurality of mechanically independent but electrically associated accumulating devices such as the one shown in Figs. 3, 4, 5 and 6. These accumulating devices are of the type disclosed in Patent 2,328,653 issued to Lake et al. on September 7, 1943, and they have been labeled in the wiring diagram (Figs. 11d and 11e) as magnets A1, S1 through A6, S6, reading from right to left, to represent the advance and stop magnets corresponding to the various digital orders of the serial numbers and quantity numbers in units, tens and hundreds. While any suitable number of these devices may be employed, depending upon the magnitude of the highest serial number to be employed for serial numbering purposes, six such accumulating devices have been disclosed, the serial number counter group and the quantity counter group consisting of three each. The accumulating devices are substantially identical in construction and it is thought that a description of one thereof will suffice for them all.

Each accumulator order is mounted on an individual plate and comprises a register device and a drive device with clutching means between them. The clutching means is controlled by a clutch lever provided on one arm with an armature disposed between advance and stop magnets. To enter a true number, the advance magnet is energized at a differential time of a cycle selected by a representation of the number on a record card. Energization of the advance magnet moves the armature and lever in a direction to cause clutching of the register device to the drive device. After being driven a differential amount equivalent to the number, a mechanical knockoff in the drive gearing restores the clutching power to declutching position, causing the register device to stop. If the number to be entered is a complement, the advance magnet is energized at a predetermined time of the cycle to initiate rotation of the registering device. At a differential time of the cycle selected by the number designation on a record card, the stop magnet is energized, rocking the armature and lever in a direction opposite to the direction in which they moved by the advance magnet. As a result, the rotation of the register device is stopped after it has entered the complement of the designated number. The advance magnet is energized momentarily to move the clutch lever and armature to clutch engaging position, but the clutch lever and armature are to remain in this position until the register device is to be declutched either by operation of the mechanical knockoff or by energization of the stop magnet. For this purpose a toggle device is provided which straightens out to retain the clutch lever impositively in clutching position.

An accumulator plate unit (Fig. 3) comprises a mounting plate 201 which has fixed to it a sleeve 202 rotatably carrying a drive device comprising rigidly united ratchet 203 and gear 204. Gear 204 is continuously driven by a gear 205 fixed on a shaft 206 journaled in the side frames 21 of the machine. All of the individual accumulator plate units are mounted on the shaft 206 in this manner and a suitable driving connection (not shown) is provided between the shaft 206 and the continuously rotating shaft 40 (Fig. 1) of the punching machine. Gear 205 makes one revolution a cycle and has sixteen teeth while gear 204 has ten teeth.

Rotatably carried by a hub of ratchet 203 is a disc 207 having ten teeth 208 adapted to be engaged by a tooth 209 on the long arm of a clutch lever 210 to hold the disc against rotation in a counterclockwise direction. At the side of disc 207 is a register wheel 211 rotatable on sleeve 202 and provided with ten peripheral notches 212. Wheel 211 may take any of ten rotative positions corresponding to values 0 to 9. A spring pressed lever 213 engages with a notch 212 of the register wheel to hold the wheel impositively and to center it in the value position to which it has been rotated. A transfer cam 214 is fixed to the side of wheel 211 by a pair of studs 215 and 216. These studs extend through openings of disc 207 to positions adjacent ratchet 203 where stud 215 pivotally carries a clutch dog 217 and stud 216 anchors one end of a spring 218. The other end of the spring is connected to the free end of dog 217 to urge a tooth 219 of the clutch dog to engage ratchet 203. In the positions shown in Fig. 3, the clutch lever 210 is in declutching position, its tooth 209 is restraining rotation of disc 207 counterclockwise, and clutch dog 217 is clear of ratchet 203. The clutch dog is being held clear of ratchet 203 by coaction of a pin 220 on the dog with the upper portion of a cam edge 221 of disc 207. When the clutch lever 210 is droped to cause its tooth 209 to release the disc 207 for counterclockwise movement, the spring 218 is effective to rock the clutch dog 217 into engagement with ratchet 203. During this movement of the clutch dog, its pin 220 rides down the cam edge 221 of disc 207 and cams the disc counterclockwise until its tooth 208, previously engaged by tooth 209, is to the right of the latter tooth. The parts are then in clutching positions, shown in Fig. 3, and the register wheel 211 is coupled to the drive device 203—204 for rotation. Through engagement of the pin 220 of the clutch dog with cam edge 221, the disc 207 is forced to rotate counterclockwise together with the register wheel.

When the clutch lever 210 is returned to upper declutching position, its tooth 209 intercepts a tooth 208 of disc 207 and stops the disc. The register wheel and clutch dog continue rotating while cam edge 221 of disc 207 cams the pin 220 of the clutch dog upwardly until it is again in its outer position. As the pin 220 is cammed outwardly, clutch dog 217 moves clear of ratchet 203 and declutches the register wheel from the driving means. The register wheel is then held and centered in its new value position by lever 213.

The clutch lever 210 is held in either clutching or declutching position by a latch 222. The latch is pivoted on a stud 223 carried by an arm of a bracket 224. A spring 225 between the bracket and the latch urges the latch counterclockwise. The bracket is secured to the plate 201 by a clamping screw 226 passing through a vertical slot 227 of the bracket and threaded into the plate. A pin 228 extending from the plate freely projects into slot 227. When the screw 226 is loosened, the bracket may be adjusted vertically and slightly angularly to proper position, thereby also providing an adjustment for the tension of spring 225. With the clutch lever 210 in upper, declutching position, the wedge-shaped tip of the lever is seated firmly in a slot 229 of latch 222. When the clutch lever is moved down to clutching position, its wedge-shaped tip cams against the inclined wall of notch 229 and forces the latch clockwise until the lever tip is below and clear of the notch. The spring 225 then snaps the latch back in a counterclockwise direction, placing an inclined edge 230 thereof above the top of lever 210 to retain the lever in lower, clutching position. The free ends of the lever and latch project into a guide slot 231 formed in bracket 224 and by which sidewise movement of the lever and latch out of their proper planes is prevented. The upper, right-hand end of slot 231 also serves as a stop for the counterclockwise movement of latch 222 when clutch lever 210 is rocked downwardly and released from the notch 229 of the latch.

The clutch lever 210 has a short arm swiveled to the lower end of an armature 232. The armature is disposed between an advance magnet AM and a stop magnet SM mounted on the plate 201. Energization of magnet AM rocks armature 232 clockwise to lower the lever 210 thereby clutching in the register device for adding of true numbers. Energization of magnet SM rocks armature 232 counterclockwise to raise the lever 210 to effect the stopping of the register device when entering the complement of a true number.

The mechanical knockoff for moving the clutch lever 210 from lower to upper declutching position comprises a lever 233 pivoted on a stud 234. A compression spring 235 normally urged the lever 233 to pivot clockwise about stud 234 thereby causing a stud 236 attached to an arm portion of said lever to ride on the periphery of a cam 237 fixed on the shaft 206. The register wheel clutch disengaging becomes effective when the stud 236 on the lever 233 enters either of the low dwells 238 or 239 of the cam. The lever 233 will be forced to pivot by action of its compression spring, causing the clutch lever 210 to engage the disc 207 and consequently stop the register wheel 211. The dwell 238 is positioned to effect mechanical knockoff at the end of the reading portion of each machine cycle, the knockoff operating between 140° and 155° on the machine index. The dwell 239 is positioned to effect mechanical knockoff after each carry impulse to the accumulator unit has caused the register wheel to add one.

Accumulator carry mechanism

Figure 3:
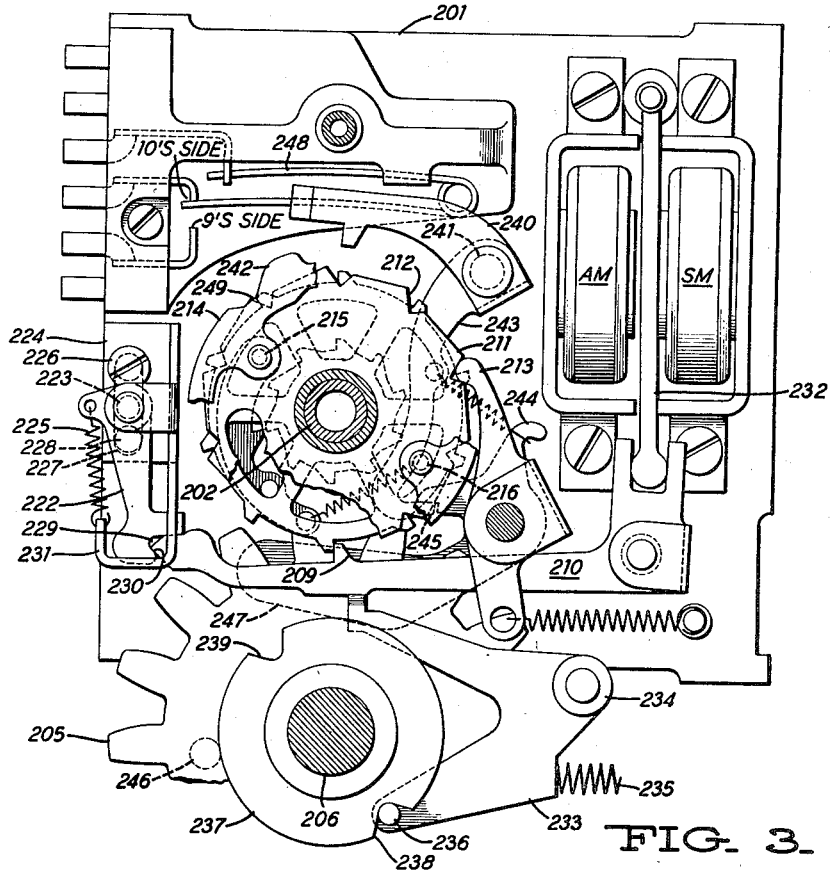
Fig. 3 is a sectional view of the accumulator plate unit, showing the declutched condition of the parts.
Figure 4:
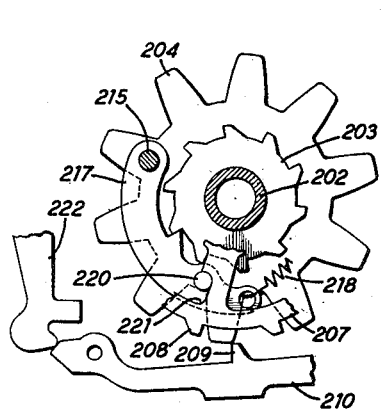
Fig. 4 is a sectional view, showing the clutched condition.
Figure 5:
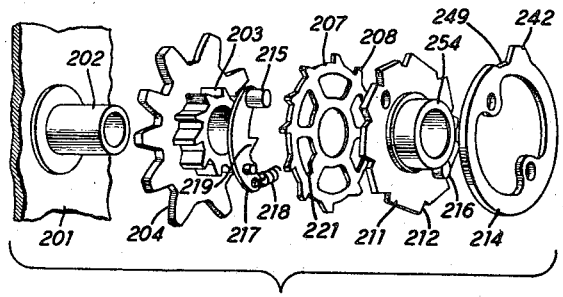
Fig. 5 is an exploded view, on a reduced scale, of the clutch.
Figure 7:
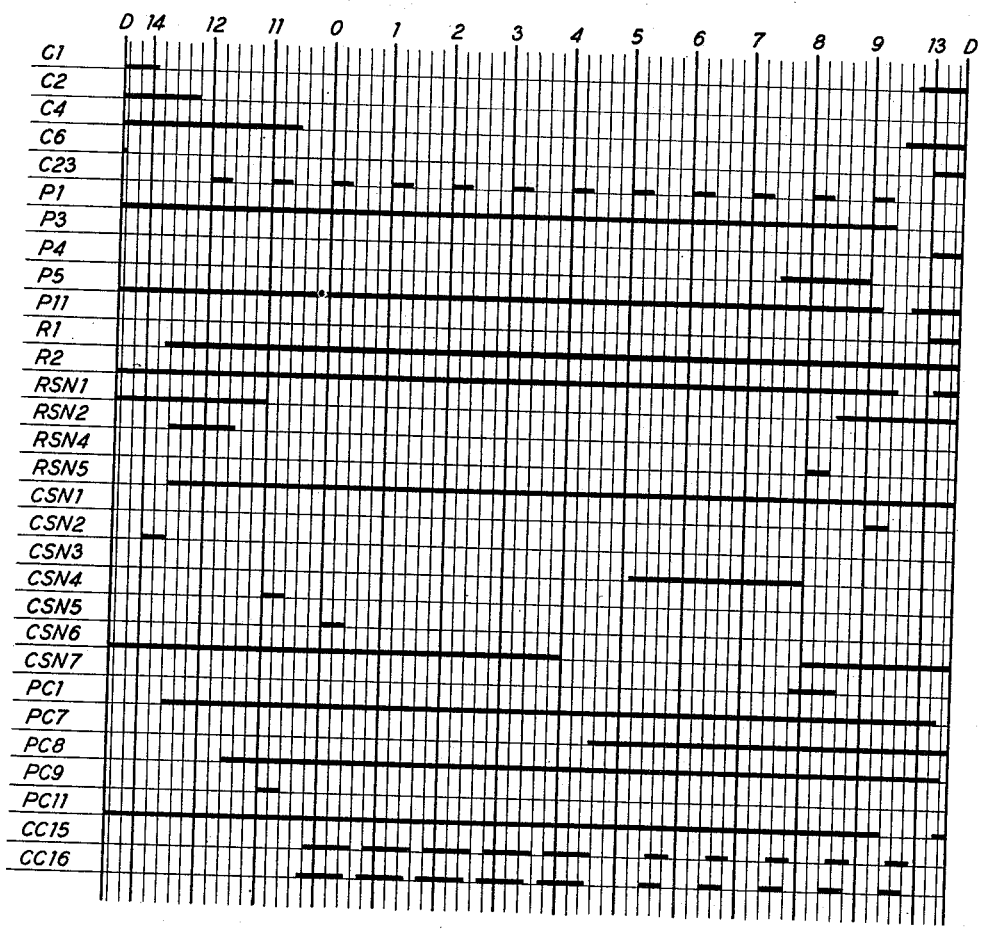
Fig. 7 is a timing chart.

The carrying from one accumulator order to the next is carried out in a well-known manner, and by circuits to be later described, under control of a normally open 9—10 contact associated with each register wheel. A carry is indicated by the register wheel when its passes from 9–0 to close and and latch the 9—10 contact on the 10's side as shown in Fig. 3. A 9—10 contact lever 240 pivoted on a stud 241 is cammed clockwise by a lobe 242 on the transfer cam 214 to close the 9—10 contact on the 10's side as the register passes from 9–0 and as the contact lever moves clockwise and arm 243, integral with said lever, also moves clockwise allowing a spring operated latch lever 244 to get behind the hook-shaped end 245 of the arm and latch the 9—10 contact closed on the 10's side for the duration of the carry cycle. A stud 246 on the drive gear 205 acts upon the surface 247 of latch lever 244 to restore same after carry time and release the 9—10 contact lever, permitting the contact brush 248 to assume a neutral position at the end of each machine cycle. Cam 214 also has a recess 249 which reverses the operation of the contact lever 240 and allows the contact brush 248 to transfer to the 9's side whenever the register wheel stands at 9.

Accumulator readout mechanism

Figure 6:
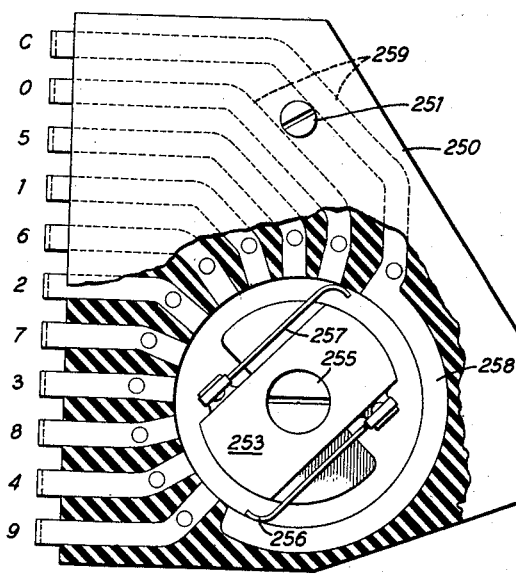
Fig. 6 is a view showing the details of the digit readout unit.

Referring to Fig. 6, there may be seen a well-known type of accumulator digit readout unit. These units are of the commutator type and there is one provided for each accumulator plate unit. Each readout unit comprises a moulding plate 250 of insulating material which is suitably fastened to the front side of each accumulator plate unit by screws 251, 252. The plate 250 is, therefore, stationary with respect to a rotatable wiper structure 253 which is mounted on a sleeve 254 of the register wheel 211 and retained thereon by means of screw stud 255 for rotation with said wheel 211. The wiper structure consists of a pair of wipers 256 and 257, one of which makes contact with a common conducting segment 258 as the other wiper makes contact with digit representing contact segments 259 which are carried by the moulding plate 250. The wipers 256, 257 are not diametrically opposite, but are displaced an amount so that wiper 256 serves as the common while the register wheel moves from 0 to 4 with wiper 257 contacting the corresponding segments 259 and wiper 257 serves as the common for the digits 5 through 9 as wiper 258 contacts the corresponding segments 259. There is a diagrammatic showing in Fig. 11e of the readout for the serial number accumulator group and associated electrical connections. Emitter EM shown in Fig. 11e transmits a series of differentially timed impulses to the digit representing contact points to thereby transmit differentially timed digit representing impulses selected according to the contact segment 259 contacted by a wiper, to print magnets to print the serial number in each detail card.

Printing mechanism

The printing station is located between the feed rollers 158, 159 and the right-hand feed rollers 260, 261 (Fig. 2b) and is in two parts. One part comprises the platen operating mechanism while the other part includes the printing wheels, ribbon mechanism, and main drive mechanism for the printing wheels and ribbon mechanism. Reference may be had to the previously mentioned Patents 2,448,781 and 2,531,873 for a full and comprehensive understanding of the various parts and functions of the print mechanism, as well as of the operation of the device as a whole. A brief description will be given here for the purpose of illustration in connection with the present invention.

The print unit has a main frame comprising two vertical plates 289, 290 as shown in Fig. 2b. Journaled in the plates 289 and 290 is a shaft 297 (Figs. 8 and 9) on which is secured the type wheel drum 298 on which the type wheels generally designated 299, are rotatably mounted.

Figure 9:
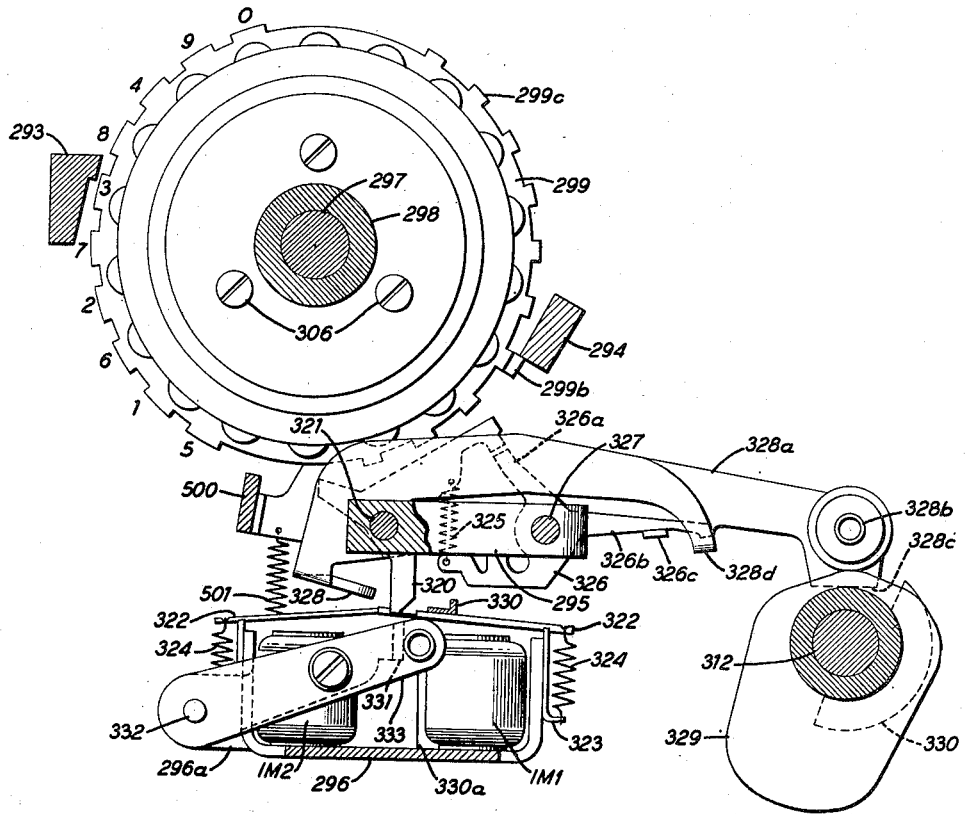
Fig. 9 is a view showing certain parts of the printing mechanism in the normal position.

The type wheels are oscillated between the stop bars 293, 294 which limit the operative stroke of the type wheels, and for this purpose each type wheel is provided with a long stop tooth 299b (Fig. 9) and is also provided with teeth 299c one for each of the characters "0" to "9" inclusive. The upper half of the periphery of the type wheels is provided with type characters in the order 5, 1, 6, 2, 7, 3, 8, 4, 9, 0. The teeth 299c correspond to the characters and are located diametrically opposite the corresponding character. In Fig. 9 the type wheels are shown in the fully set position and are about to be restored in a clockwise direction.

Figure 8:
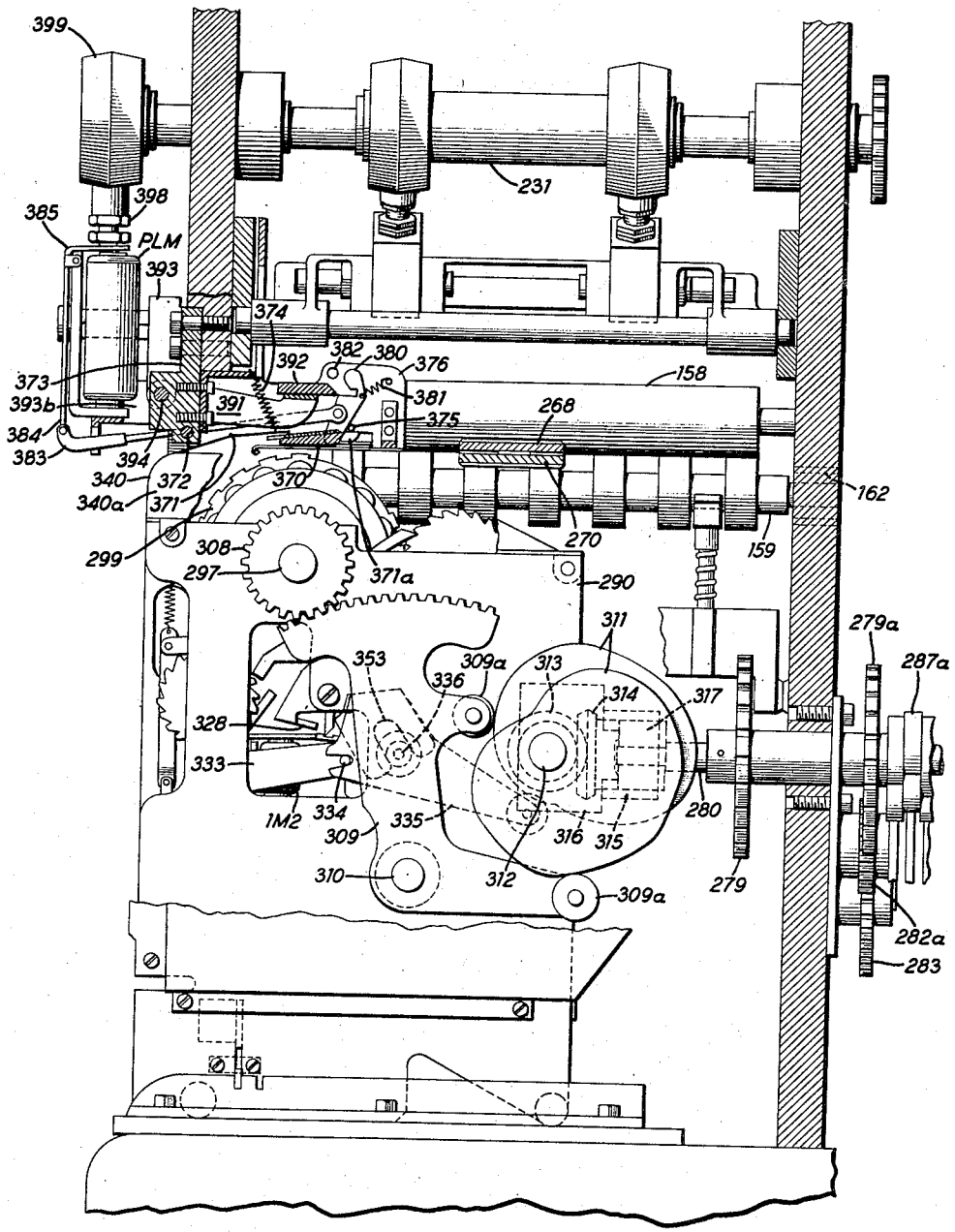
Fig. 8 is a large scale vertical section on the line 8—8 of Fig. 2b with the punch magnet removed.

Shaft 297 is oscillated by mechanism which is generally shown in Fig. 8. Secured to the shaft 297 is a gear 308 which meshes with a gear sector 309 on shaft 310 journaled in the plates 289, 290. The gear sector 309 takes the form of a cam follower having rollers 309a cooperating with complementary cams 311 on a cam shaft 312 also journaled in the plates 289, 290. The shaft 312 is provided with a bevel gear 313 meshing with a bevel gear 314, the hub of which is rotatably mounted in a flanged bearing member 315 secured to a gear housing 316 fixed to the side plate 290.

When the shaft 312 rotates, the complementary cams 311 oscillate the gear sector 309 and thereby oscillate the shaft 297 through gear 308. The parts are shown in Figs. 8 and 9 in the position taken when the machine stops with both clutches disengaged. In this position the type wheels will have been oscillated to the limit of their setting stroke, that is the counterclockwise part of the stroke during which the type wheels may be stopped selectively under control of impulses from the record sensing brushes or the storage relays of the print mechanism as will be made clear hereinafter.

The selective stoppage of the type wheels preparatory to printing is controlled by stop pawls 320 (Fig. 9) which are pivoted on a rod 321 carried by the bar 295, this bar being provided with transverse slots which hold the pawls 320 in alignment with their respective type wheels 299. Normally the pawls 320 are latched in the position of Fig. 9 by the armatures 322 of the interpreting magnets designated IM1 to IM8 of which only the first two are shown in Fig. 9. The even numbered magnets are located in a row on the left while the odd numbered magnets are located on the right and are staggered with reference to the others. The magnets IM1 to IM8 are mounted on the cross-frame 296 and their armatures are pivoted on brackets 323 attached to upstanding posts or lugs formed in the frame 296. Springs 324 anchored to the brackets 323 urge the ends of the armatures, which are provided with latching shoulders, into engagement with the tails of the pawls 320 to hold them in the position of Fig. 9.

The pawls 320, when released, are urged in a clockwise direction into engagement with the teeth 299c of the type wheels by means of springs 325 which are anchored to stop arms 320a in the pawls 320 and also to zero pawls 326 which are pivoted on a rod 327 carried by the frame 295. The zero pawls 326 have stop portions 326a abutting the stop portions 320b in the position of Fig. 9 to prevent the pawls 320 from engaging the type wheels. The zero pawls 326 are provided for the purpose of preventing printing of the zeros to the left of a significant figure and for a full disclosure of their operation reference may be had to the afore-mentioned Patent 2,531,873.

The timing of the cam shaft 312 is such that at about the middle of each cycle the cam 329 will have elevated cam follower arm 328a to its highest position in which the bail 328 will have rocked the pawls 320 counterclockwise slightly beyond the position of Fig. 9 to relatch those pawls 320 which may have been previously tripped as a preparation for a new setting of the type wheels. Shortly thereafter, before the "5" in the cycle is reached, the arm 328a is allowed to drop until the surface 328c engages the periphery of a cam 330 formed in the hub of the cam 329. This allows the bail 328 to move clockwise where it remains throughout the last half of the cycle, during which the type wheels will be set under control of impulses to the magnets IM1 to IM8.

At the end of the cycle, when all of the type wheels have been set, the cam surface 328c trips off the cam 330, this occurring just beyond "9" time and when the machine stops, if it is going to stop for any reason, the cam 329 will occupy the position of Fig. 9 with all the type wheels which have had a magnet IM1 to IM8 tripped in the printing position. The reason for this is that on account of space limitations, the actual printing from a line of type on the type wheels 299 must take place during the cycle following the one in which the record passes the record sensing brushes. The actual printing time takes place at about "11" in the following cycle, that is when the preceding card passing the brushes 19 has the "11" index-point positions under said brushes. This printing time is adjusted so that the actual printing takes place while the punched card is momentarily at rest.

Printing from a line of type set up on the printing drum and exposed on the printing line is effected by a platen mechanism under the control of platen control magnets designated PLM (Fig. 8). Printing is effected by means of a platen 370 which is attached to a bail 371 pivoted at 372. Springs 374 attached to the bail 371 hold the bail with projections 371a on its side arms up against a stop rod 375 carried by a frame 376.

Pivotally mounted on studs at the ends of the bail 371 are two bail operating hooks 380 similar to the hooks 212 attached to the punches 198 (Fig. 2b). Each hook 380 is urged in a clockwise direction against the stop rod 375 by a spring 381. A knockoff rod 382 is also provided for the hooks 380 which rod rigidly joins the side plates of the frame 376. The platen operating hooks 380 are connected by links 383 to downwardly extending arms 384 attached to the armatures 385 of the magnets PLM.

An operating bail is provided which includes side arms 391 and a cross-bar 392. One of the side arms 391 is secured to a second bail 393 pivoted at 394 to the block 373. The bail 393 has an arm 393b extending horizontally to the left. Arm 393b is connected by an adjustable linkage 398 to a housing 399 for a roller bearing mounted on an eccentric portion of the shaft 231.

When the shaft 231 rotates the link 398 will be vibrated up and down and will impart an oscillating motion to the bail 393 which will be transmitted to the bail comprising the side arms 391 and cross-bar 392.

Figure 10:
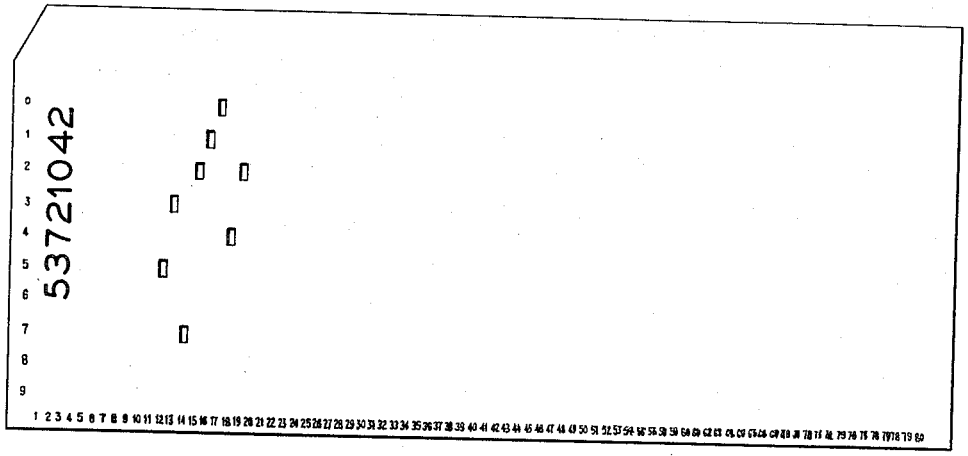
Fig. 10 is a view of the left-hand portion of a detail card.

When the magnets PLM are energized with the bar 392 vibrating up and down, the platen operating hooks 380 will be drawn into cooperative relationship with the bar 392 and the platen 370 will be operated to effect an imprint upon a card from the line of type set up in the manner explained above. Referring to Fig. 10, it may be seen that it is possible to print a row of eight digits across the left-hand end of the card.

For the purpose of controlling the operation of the magnets IM1 to IM8 there is provided a storage relay system which includes a series of printing relays designated PR1 to PR60, inclusive, in Fig. 11f. In order to save space all of these relays are not shown in the drawings, but the ones which are missing are connected according to the same system as those shown. The complete connections for all of the printing relays associated with the groups of relays for the first and second orders or positions of the printing mechanism are shown in Fig. 11f with the eighth order shown in part.

The storage relay system also includes an emitter generally designated E1 which, as shown in Fig. 11f, consists of a group of five read-in contacts or segments 403 and five readout contacts 404 which are insulatably mounted. Cooperating with these contacts 403, 404 is a brush 405 mounted on shaft 134. The emitter E1 turns at the rate of one revolution per card cycle and is timed so that during the read-in portion of the cycle, in which the brush 405 is traversing the read-in segments 403, circuits may be established through the segments 403 in synchronism with the establishment of circuits through the sensing brushes to the printing relays in a manner hereinafter to be explained. During the remaining, or readout portion of the cycle when the brushes traverse the segments 404, the spacing of such segments is such that the readout circuits are closed approximately halfway between index-point positions on the card for a purpose which will be made clear hereinafter.

*Electrical connections*

The electrical connections between the devices of the machine may be studied by reference to the wiring diagram shown in Figs. 11a to 11f. The present description will be concerned with the use of the machine for combined reproducing and gang punching operations wherein both sections of the machine are used. In the operation of the improved serial printing device comprising the present invention, the first detail card in the punch unit of the machine feeds idly through the machine ejecting into the stacker as a blank card. Novel control circuits are automatically called into action during the first machine cycle to effect four consecutive cycles of operation of the read feed. The control circuitry in addition to changing standard machine operation of the read feed also delays operation of the quantity and serial number counters in order to take care of the extra master card. The control circuitry also causes the machine to automatically take two consecutive reproduce cycles and then switch to gang punching operation during the fourth cycle without the aid of any special control perforations in the master cards. In the third cycle of operation information from both master cards in the read unit is reproduced into the second detail card. In cycle four the machine switches to gang punching using the second detail card as a master card for the third detail card, the quantity number on the trailer card is entered into the quantity counter, and also the starting serial number on the trailer card is entered into the serial number counter and also the storage relays of the print mechanism. In the fifth cycle the read unit feeds in a new master card group and the starting serial number for the first group is printed on the second detail card. The punch unit continues to operate until the required number of detail cards have been gang punched with the reproduced information and have been printed with an ascending serial number under control of the serial number counter. The serial number counter is then cleared as the first card of the next group is reproduced. The following description of the operation of the improved serial printing features of the punching machine will be based on a master card having a quantity punching of 002 indicating that two detail cards are to be serially number printed for the group of two master cards and one trailer card.

*First cycle*

Referring to Fig. 11a, when the main switch is closed 110 volts A. C. is applied across the transformer T and rectifier R to provide a source of 40 volts D. C. across the two main lines 400 and 401 of the machine. Blank cards are inserted in the feed hopper P and the originals or master cards and trailer cards are placed in the hopper R. The cards in hoppers P and R operate the respective hopper levers PHL and RHL, closing contacts PHC and RHC, and energizing relays R4, R7 and RSN12 by a circuit which extends from line 400, wire 402, contacts PHC and RHC, relays R4, R7 and RSN12, wire 403 and line 401. As will be seen later, contacts of relay RSN12 serve to control operation of the read unit and the quantity counter. Now the start key is depressed to complete a circuit from line 400, the start key, relay R19 and line 401. Energization of relay R19 closes contacts R19—1 and completes a circuit from line 400, wire 404, normally closed contacts R18—1, normally open contacts R19—1, now transferred, contacts R7—4, now transferred, contacts R4—4, now transferred, the pick coil of relay R24 and line 401.

Upon energization of relay R24, a circuit is completed from line 400, normally open contacts R24—3, now closed, motor relay RHD and line 401. The energization of the master relay RHD closes contacts RHD—1 and operates motor M through the 110 volt lines 405, 406. Also a circuit is completed to the punch clutch magnet PCM and the read clutch magnet RCM. This circuit extends from line 400 (Fig. 11a), wire 407, contacts R24—1, now closed, the normally closed side of contacts R1—2, cam contact C1, punch clutch magnet PCM to line 401 and also from the R24—1 contacts, wire 408, the normally closed side of contacts R6—2, the normally closed contacts R6—1, contacts R7—5, now closed, the cam contacts C2, read clutch magnet RCM to line 401. Through the clutch connections thus made, the punch picker is operated to feed the first detail card out of the hopper and between the first set of feed rollers 140, 142 and the read picker is operated to feed the first master card out of the hopper and between the first set of feed rollers 68, 70.

The first cycle is utilized to reset the three orders of the quantity counter to 000. As will be described hereinafter, the quantity designation which appears in the quantity field of the trailer card for the purpose of controlling the number of detail cards that are to be serially printed is entered subtractively into the quantity counter along with an added correction factor of two. The counter is then stepped one unit for each detail card that is serial number printed and when the required number of cards have been printed the counter will stand at 999. It is necessary, then to, reset the quantity counter to 000 at the start of a new group for entry of the new quantity designation from the next trailer card.

It should be mentioned at this point that the machine is conditioned for serial number printing operations by plug wiring the serial number hub SN to the ON hub (Fig. 11c) to complete a circuit which extends from line 400, hub SN, plug wire connection, ON hub, pick coil of relay RSN10 and line 401. With relay RNS10 energized as soon as a power is turned on a circuit will be completed at 13 time just before the first cycle from line 400 (Fig. 11b), cam contacts C6, contacts RSN10—1, now closed, contacts RSN12—1, now closed, normally closed side of contacts RSN9—2, the normally closed side of contacts RSN11—1, the pick coils of relays RSN3, RSN4 and line 401. Relays RSN3 and RSN 4 hold until 9.5 of the first cycle by a circuit which extends from line 400 (Fig. 11c), cam contacts R2, contacts RSN3—1, now closed, the hold coils of relays RSN3 and RSN4, and line 401. Contacts of relays RSN3 and RSN4 in the quantity counter circuitry now transfer and at 11 time of the first cycle a circuit is completed from line 400 (Fig. 11d), cam contacts CSN4, wire 409, contacts RSN3—6, RSN3—7 and RSN3—8, now closed, to the add magnets A4, A5 and A6 to start the counter wheels. As each wheel reaches zero a circuit is completed from line 400 (Fig. 11d), wire 410, contacts RSN4—2, now transferred, wire 411, the 9—10 contacts in the units order, now closed on the 10's side, contacts RSN3—3, now transferred, contacts RSN3—10, now transferred, the stop magnet S4 in the units order and line 401. The same circuit extends through the 10's side of the 9—10 contacts in the tens and hundreds orders to energize the stop magnets S5 and S6. As a result the respective register wheels are declutched and the counter stands at 000.

At 7 time in the first cycle the first master card and first detail card will have advanced a sufficient amount to close their respective card levers RCL1 and DCL to complete circuits to energize relays R1, R6 and RSN11. Referring to Fig. 11a, the circuits extend from line 400, wire 402, die card lever contacts DCLC, the pick coils of relays R1 and RSN11, wire 403 and line 401. The circuit also extends from wire 402, the read card lever contacts RCLC—1, the pick coil of relay R6, wire 403 and line 401. With relay R1 energized a circuit is completed from line 400, wire 402, cam contacts P3, contacts R1—3, now closed, the pick coil of relay R3, wire 403 and line 401. Relay R3 holds through a circuit which extends from line 400, wire 402, die card lever contacts DCLC, contacts R1—4, now closed, contacts R3—1, now closed, the hold coil of relay R3, wire 403 and line 401.

Relay RSN11 is used to control the automatic energization of punch transfer relay R38 at 13 time of the first cycle by a circuit which extends from line 400 (Fig. 11b), cam contacts C6, contacts RSN10—1, now closed, contacts RSN12—1, now closed, normally closed side of contacts RSN9—2, contacts RSN11—1, now transferred, contacts RSN10—6, now closed, the pick coil of relay R38 and line 401. Relay R38 holds through the reading portion of the second cycle or until 9.4 time by a circuit which extends from line 400, cam contacts P1, contacts R38—1, now closed, the hold coil of relay R38 and line 401. Contacts R38—1 through R38—4 serve to switch the control of the punch magnets from the punch normal hubs to the punch transfer hubs during the second cycle, the transfer hubs being under control of the reading brushes 15 and the checking brushes 16 as will be explained later.

Referring to Fig. 11a, it may be mentioned here that, with the contacts RSN10—3 and RSN12—2 both open, following the initial cycle the read feed clutch will be energized for operation during the second cycle through contacts RSN5—3, for the third cycle through RSN2—6, and to take care of the extra card of the master card group the read feed clutch will again be energized for operation during the fourth cycle through contacts RSN20—2. Relay RSN5 (Fig. 11b) will be energized at 13 time in the first cycle through contacts RSN2—11 by the same circuit that picked relay R38. The RSN5—3 contacts (Fig. 11a) then close to operate the read unit in the second cycle.

*Second cycle*

The second cycle is used to advance the first master card past the read brushes 15 up to the checking brushes 16, the second master card out of the hopper R and up to the read brushes 15, the first detail card past the punch die and the second detail card out of hopper P and up to the die.

As was previously mentioned the majority of the prepunched information appears on the first master card with the second master card containing only information relating to location or the like. In the instant application, assume that columns 1—77 of the first master card contain general prepunched information and that columns 78—80 of the second master card contain prepunched information relating to location or the like. Further assume that the reading brushes 15 for columns 78—80 only, are plug wired to the punch transfer hubs and that the checking brushes 16 for columns 1—77 only, are also plug wired to the punch transfer hubs. Consequently, it will be understood that during the second cycle, even though the punch transfer contacts are transferred to complete circuits to the punch magnets, no circuits will be completed because columns 1—77 of the first master card are not read at the read brushes 15. Therefore, during the second cycle the first detail card passes idly through the die and remains a blank card.

As will be later explained, certain of the read brushes 15 are plug wired to the entry hubs of the quantity and serial number counters (Figs. 11d and 11e), however, no entries can be made during the second cycle because contacts RSN6—3 through RSN6—8 are open. The quantity and serial number information is punched in the trailer card and hence will not be read for entry into the counters until the fourth cycle.

When the punch transfer relay R38 was energized by a circuit from cam contacts C6 (Fig. 11b) at 13 time in the first cycle, a parallel circuit extended from the transferred side of contacts RSN11—1, through normally closed contacts RSN2—11, the pick coil of RSN5 and line 401. Relay RSN5 holds until 9.5 time in the second cycle by a circuit which extends from line 400 (Fig. 11c), cam contacts R2, contacts RSN5—1, now closed, the hold coil of relay RSN5 and line 401. Relay RSN5 initiates the completion of the necessary circuits to energize the read feed clutch magnets for operation of the read unit during the third cycle.

With the energization of relay RSN5, a circuit is completed at 14.4 time in the second cycle which extends from line 400 (Fig. 11c), cam contacts RSN2, wire 412, contacts RSN5—2, now closed, the pick coil of relay RSN13 and line 401. Relay RSN13 holds until 9.5 time in the second cycle through its own RSN13—1 contacts and cam contacts R2. Now at 7.5 time in the second cycle a circuit is completed from line 400 (Fig. 11b), cam contacts P4, contacts RSN13—2, now closed, the pick coil of relay RSN2, wire 413 and line 401. Relay RSN2 holds until 11 time in the third cycle through a circuit which extends from line 400, cam contacts RSN1, contacts RSN2—1, now closed, the hold coil of relay RSN2 and line 401. The RSN2—6 contacts (Fig. 11a) will now close to provide a circuit to energize the read feed clutch magnets RCM for the third cycle.

When relay RSN13 was energized through cam contacts RSN2 (Fig. 11c) at 14 time a parallel circuit was completed through the closed RSN11—2 contacts, the pick coil of relay RSN9 and line 401. Relay RSN9 holds through a circuit which extends from line 400 (Fig. 11a), wire 402, closed die lever contacts DCLC, contacts RSN9—1, the hold coil of relay RSN9, wire 403 and line 401. Relays RSN9 and RSN11 will remain energized as long as the die card lever contacts are closed.

The second cycle is also used to enter a correction factor of 2 into the units order of the quantity counter. It is necessary to give the counter this advance to accumulation because of the fact that it is necessary for the counter to anticipate the fact that the last card is being printed at least one cycle before the cycle in which such last card is printed in order to allow time for setting up the controls to feed a new master card group.

This is accomplished by adding two separate units to the counter, one at 8 time and another at 13 time. With relay RSN2 energized at 7.5 time, contacts RSN2—8 (Fig. 11e), are closed and a circuit is completed at 8 time from line 400, wire 414, cam contacts RSN4, transferred contacts RSN2—8, closed contacts RSN12—3, wire 415, normally closed contacts RSN6—11 (Fig. 11d), normally closed side of contacts RSN3—6, the units order add magnet A4 and line 401. At 8.9 time a circuit is completed from line 400 (Fig. 11e), cam contacts CSN1, contacts RSN10—4, now closed, wire 416, the normally closed side of contacts RSN3—10 (Fig. 11d), the units order stop magnet S4 and line 401. As a result the units counter wheel turns one step and stops. At 13 time a circuit is completed from line 400 (Fig. 11e), cam contacts P11, contacts RSN10—5, now closed, normally closed contacts RSN20—4, contacts RSN13—12, now closed, contacts RSN9—4, now closed, contacts RSN12—3, now closed, RSN6—11 and RSN3—6 (Fig. 11d), wire 415, contacts RSN6—11 and RSN3—6 (Fig. 11d), units order add magnet A4 and line 401. At 14 time a circuit is completed from line 400 (Fig. 11e), cam contacts CSN2, contacts RSN10—4, now closed, wire 416, normally closed side of contacts RSN3—10, the units order stop magnet S4 and line 401. Thus, another unit is added to the quantity counter which now stands at 002.

When cam contacts P11 closed at 13 time to pulse the units order add magnet of the quantity counter, a parallel circuit was completed through the closed contacts RSN10—5 (Fig. 11e), wire 417, closed contacts RSN2—12 (Fig. 11b), the pick coil of relay R38 and line 401. Thus, punch transfer relay R38 is energized a second time for the purpose of switching the contacts R38—1 through R38—4 and connecting the punch transfer hubs to the punch magnets throughout the reading portion of the third cycle.

The relay R24 which was energized at the start of the first cycle through the depression of the start key will remain energized until approximately 9.2 time of the first cycle through a circuit which extends from line 400 (Fig. 11a), cam contacts P5, contacts R24—1, the hold coil of relay R24 and line 401. To prevent relay R24 from dropping out near the end of the first cycle, the start key is held for three cycles until the first detail card arrives at the punch brush station 19 where it operates a punch brush card lever PBCL to complete a circuit from line 400, wire 402, punch brush contacts PBC, now closed, the pick coil of relay R10, wire 403 and line 401. Energization of relay R10 completes a hold circuit for relay R24 which extends from line 400, wire 404, the normally closed contacts R18—1, punch stacker switch, contacts R6—4, now closed, contacts R10—2, now closed, contacts R1—1, now closed, contacts R4—2, now transferred, contacts R24—1, now closed, the hold coil of relay R24 and line 401. The motor M will now keep running and cards will be fed as long as they are present or until a stop key is depressed or until all of the previously mentioned control contacts in the circuit to the read clutch magnets are opened. Depression of the stop key will complete a circuit from line 400 (Fig. 11a), the stop key, the hold coil of relay R18 and line 401. The energization of the hold coil of relay R18 would open the contacts R18—1 to drop out relay R24 and thereby stop the machine.

*Third cycle*

In the third cycle the first master card passes the checking brushes 16, the second master card passes the read brushes 15 and the trailer card advances out of the hopper R to the read brushes 15. Meanwhile, the first detail card advances past the punch brushes 19 to the print station, the second detail card advances past the punches and a third detail card advances out of the hopper P up to the die.

Since the contacts R38—1 through R38—4 were transferred at the end of the second cycle and since the read brushes and checking brushes are plug wired to the punch transfer hubs, as previously described, the prepunched information on both the first and second master cards will be reproduced into the second detail card during the third cycle in the well-known manner through cam contacts P1, C23, R1 and card lever contacts RCLC.

It will be remembered that relay RSN2 was energized in the second cycle and remains energized until 11 time in the third cycle. Therefore at 14.4 time in the third cycle a circuit is completed from line 400 (Fig. 11c), cam contacts RSN2, wire 412, contacts RSN2—3, now closed, contacts RSN12—4, now closed, the pick coil of relay RSN19 and line 401. Relay RSN19 holds until 9.5 time of the third cycle by a circuit which extends from line 400, cam contacts R2, contacts RSN19—1, now closed, the hold coil of relay RSN19 and line 401. Now, at 7.5 time a circuit is completed from line 400 (Fig. 11b), cam contacts P4, contacts RSN19—2, now closed, pick coil of relay RSN20, wire 413 and line 401. Relay RSN20 holds until 11 time in the fourth cycle by a circuit which extends from line 400, cam contacts RSN1, contacts RSN20—1, now closed, the hold coil of relay RSN20 and line 401. The RSN20—2 contacts (Fig. 11a) will now close to energize the read feed clutch magnets RCM to operate the read unit during the fourth cycle.

*Fourth cycle*

In the fourth cycle the first master card ejects into the stacker, the second master card passes the checking brushes 16, the trailer card passes the read brushes 15 and the first master card of the next group advances out of the hopper R to the read brushes. Meanwhile, the first detail card passes the print mechanism and ejects into the stacker as a blank card, the second detail card passes the punch brushes 19 as the third detail card passes the punches and a fourth detail card advances out of the hopper P to the die. The punch transfer relay R38 drops out at 9.4 time in the third cycle opening the contacts R38—1 through R38—4. With the gang punch brushes 19 plug wired to the punch normal hubs (Fig. 11b) the reproduced information on the second detail card is gang punched into the third detail card during the third cycle through contacts R10—5, now closed, and cam contacts C23 and P1 in the well-known manner. The machine will now continue to gang punch in succeeding cycles until a new group of master cards are encountered.

At 14.4 time in the fourth cycle a circuit will be completed from line 400 (Fig. 11c), cam contacts RSN2, contacts RSN20—3, now closed, the pick coils of relays RSN6, RSN7 and line 401. These relays will hold until 9.5 time in the fourth cycle by a circuit which extends from line 400, cam contacts R2, contacts RSN6—1, now closed, the hold coils of relays RSN6, RSN7 and line 401.

Figure 11D:
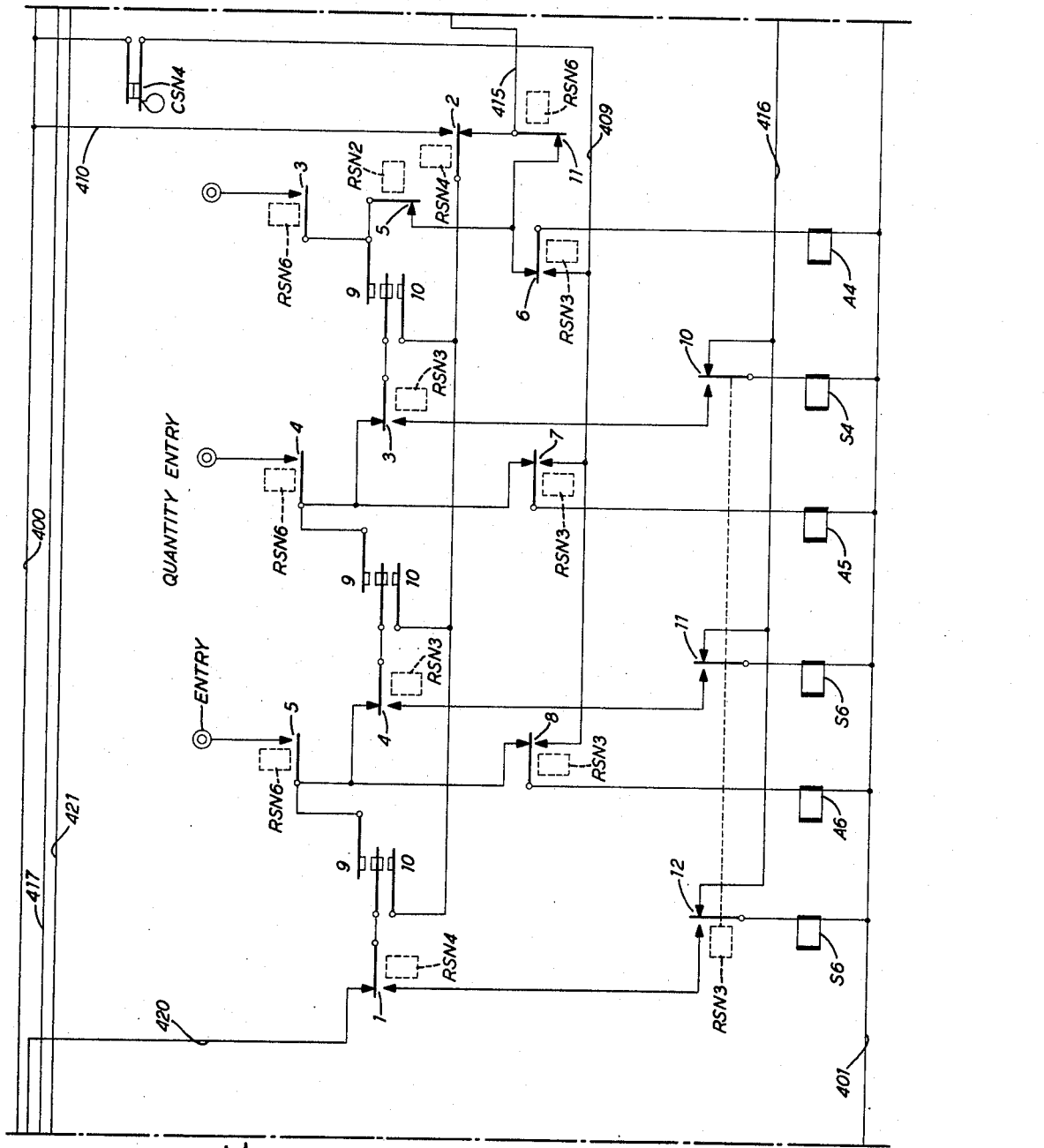

Contacts RSN6—3 through RSN6—5 will now close to prepare the read-in circuits for the quantity number counter. The quantity number is read from the trailer card as it passes the read brushes 15 and the read brushes for the quantity number field are plug wired to the entry hubs of the quantity counter (Fig. 11d).

In the present example, a quantity number of 2 was punched at the trailer card and therefore a brush impulse at "2" time passes from the counter entry hub in the units order through contacts RSN6—3, now closed, contacts RSN2—5, now closed, normally closed side of contacts RSN3—6, the add magnet A4 and line 401 to start the counter wheel turning. The quantity number is to be entered into the counter as a complement. Therefore, at 8.9 time an impulse is directed from line 400 (Fig. 11e), cam contacts CSN1, contacts RSN10—4, now closed, wire 416, the normally closed side of contacts RSN3—10, the stop magnet S4 and line 401. The units order counter wheel stops on a position corresponding to the 9's complement of "2", namely "7". In the other positions the quantity counter add magnets receive 0 brush impulses and the counter wheels are stopped at 9 by the impulse from cam contacts CSN–1. Since the counter originally stood at 002, due to the previous entry of the correction factor, it now stands at 002 plus 997 or 9999.

Also, during this cycle a starting serial number, such as 015, is read from the trailer card by the read brushes 15 and entered into the serial number counter as a true number. The read brushes 15 for the starting serial number field are plug wired to the entry hubs of the serial number counter (Fig. 11e). The cards are fed 12 edge first and so the counterwheels are started at 0 brush reading time by an impulse from cam contacts CSN5. A sample circuit extends from line 400, cam contacts CSN5, contacts RSN6—6, now closed, wire 417, units order add magnet A1 and line 401.

The circuits to the stop magnets to stop the counter wheels are conditioned by two control relays RSN15 and RSN17. Referring to Fig. 11e, a circuit is completed at 8 time in the fourth cycle which extends from line 400, wire 414, cam contacts RSN4, wire 418, contacts RSN7—10, now closed, the pick coil of relay RSN15 and line 401. Relay RSN15 holds until 4.0 time in the next cycle through a circuit which extends from line 400 (Fig. 11c), cam contacts CSN6, contacts RSN15—1, now closed, the hold coil of relay RSN15 and line 401. Referring to the right-hand side of Fig. 11c, it may be seen that normally closed contacts RSN15—2 are in the pick circuit for control relay RSN17 along with cam contacts CSN7 and RSN5. The pick coil of relay RSN17 will normally be energized from 14.3 to 13.5 time of every cycle through the normally closed contacts RSN15—2 and cam contacts RSN5. However, when relay RSN15 was energized at 8 time in the fourth cycle, contacts RSN15—2 opened and the hold circuit for relay RSN17 now extends through the cam contacts CSN7 and RSN5. Cam contacts CSN7 break at 8.6 time of each cycle and so relay RSN17 will hold until 8.6 time in the fourth cycle.

Now any brush impulse from "1" to "8" will stop the counterwheels of the serial number counter to register the starting serial number punched in the trailer card. For example, for a starting serial number of 015 the "5" brush impulse is directed at 5 time from the units order entry hub of the serial counter, through contacts RSN7—6, now closed, wire 419, contacts RSN17—1, now transferred, the stop magnet S1 and line 401 to enter the true number of 5 into the units order. If a brush impulse occurs at 9 time it cannot be transmitted to the stop magnet because relay RSN17 drops out at 8.6 time transferring the contacts RSN17—1 through RSN17—3. Instead a "9" impulse is transmitted from line 400, cam contacts CSN1, contacts RSN10—4, now closed, wire 416, the normally closed side of contacts RSN17—1 through RSN17—3, the stop magnets S1—S3 and line 401. If the brush impulse is a "0" impulse the add magnet and stop magnet are energized simultaneously and the counter wheel remains stationary.

It becomes necessary in the fourth cycle to transmit the starting serial number 015 to set up the print wheels of the print mechanism so that the starting serial number may be printed on the second detail card as it passes the print station during the fifth cycle. The printing circuitry is shown in Fig. 11f and in this connection it may be stated that in the interest of brevity the necessary circuitry has been shown for only two orders of printing, the units and tens orders. For a complete disclosure of all of the circuit connections for the print magnets IM1 through IM8 and the storage relays PR1 to PR60 reference may be had to Patent 2,448,781.

In the present instance, the impulses from the starting serial number field of the trailer card are transmitted to the print mechanism through the exit hubs of the serial number counter. For example, the read impulse for the digit 1 in the tens order of the serial number read from the trailer card is directed from the tens order entry hub of the serial counter to the add magnet A2 and it is also directed from said entry hub through the contacts RSN7—7, now closed, contacts RSN7—3, now transferred, contacts RSN10—10, now closed, the tens order exit hub and by a plug wire connection to the hub PS7 (Fig. 11f) for the second or tens order of the print storage relay arrangement. From the hub PS7 the circuit continues through contacts PR42a, contacts PR52a, relay PR31p and wire W4 to the line 401, it being assumed that contacts PR52a are closed.

The closure of this second or printing storage circuit at "1" time in the cycle is permitted through the operation of the emitter E1, which, at "1" in the cycle, causes energization of the relay PR52 by a circuit traced as follows: line 400, cam contacts PC1, wire W3, cam contacts CC15, CC16, the emitter common strip, the "1" read-in contact of the emitter E1, relays PR51, PR52 and wire W5 to line 401. Consequently, the energization of print relay PR31p results and the contacts PR31b are closed and PR31a are opened. Contacts PR31c also close and establish a holding circuit of less than a cycle duration for the holding coil PR31h traced from line 400, contacts PC1, wire W3, contacts PC8, contacts PR31c, coil PR31h, and wire W4 to line 401. Thus, at the "1" point in the cycle the print magnet IM2 is not energized but a double coil relay whose coils are designated PR31p and PR31h will be energized and will be kept energized until the end of the cycle by means of the contacts PC8. The effect is to store the value "1" by setting a relay to represent such value.

At 5 time in the cycle a circuit is established as follows: line 400, contacts PC11, R87b, R87d, PC7, and relays PR41 and PR42 in parallel to line 401.

At this point it is desired to explain that relay R87 is energized as soon as cards feed between the punch brushes 19 in consequence of closure of card lever contacts PBC (Figure 11a), provided the print control switch S4 is closed. Because of the fact that a card must be printed during the cycle following the one in which it passes the punch brushes 19, a holding circuit would be provided to keep relay R87 energized after the card lever contacts PBC have opened in consequence of the last card passing the brushes 19.

The closure of the circuit through the relays PR41 and PR42 is timed so that these relays are energized slightly before the read brush 15 senses the "5" hole in the trailer card representing the digit in the units order of the starting serial number. There are four sets of contacts for each relay PR41, PR42 of which the normally closed contacts are designated PR41a, PR42a, while the open contacts are designated PR41b, PR42b.

The 5 brush impulse when entered into the units order of the serial counter is also transmitted from the units order exit hub by plug wire to hub PS7 of the units order printing circuit, thence through contacts PR42b and the contacts PR40a, PR39a, PR38a, PR37a, PR36a, and the units printing magnet IM1 to line 401. The energization of magnet IM1 at 5 time in the cycle will cause the units order type wheel to be stopped at the "5" position with the "5" character thereon facing the platen.

Approximately half-way between the "5" and "6" index-point positions of the card, a second circuit will be established by the emitter E1 through one of the readout contacts traced as follows: line 400, contacts PC1, wire W3, contacts CC15, CC16, the common strip of emitter E1, the "1" readout contact of emitter E1, contacts PR31b, and magnet IM2, to line 401. The type wheel for the tens position is then stopped with the "1" type facing the platen in consequence of the arrangement of the type in which the "1" type appears between the "5" and "6" types respectively. In this fashion the type wheels will have been set to print "15". The zeros to the left of the numeral "1" will not be printed because of the effect of the zero pawls 326 for the third to eighth positions of the printing mechanism.

At 13 time in the fourth cycle a 1 is added to the serial number counter and to the quantity counter. The 13 impulse to the serial number counter passes from line 400 (Fig. 11e), cam contacts P11, contacts RSN10—5, now closed, contacts RSN20—4, now closed, the now closed contacts RSN13—12, RSN9—4, RSN2—8, RSN13—11, RSN2—7, RSN6—10, RSN13—7, then through the units add magnet A1 and line 401. At 14 time an impulse is transmitted from line 400, cam contacts CSN2, contacts RSN10—4, the normally closed side of contacts RSN17—1, the units order stop magnet S1 and line 401. The serial number counter then advances from 015 to 016.

In similar fashion the 13 impulse from cam contacts P11 is transmitted through the now closed contacts RSN10—5, RSN20—4, RSN13—12, RSN9—4, RSN12—3, wire 415, contacts RSN6—11 (Fig. 11d), contacts RSN3—6, to the units order add magnet A4 of the quantity counter and line 401. Since the quantity counter stood at 999 at the beginning of the fourth cycle all of the 9's contacts will be closed and the 13 impulse will also pass from the normally closed side of contacts RSN3—6, through the closed contacts RSN2—5, closed 9 contacts in the unit order, normally closed side of contacts RSN3—3 and RSN3—7, the add magnet A5 in the tens order and line 401. The hundredths order add magnet is impulsed in similar fashion. The impulse at 14 time to the stop magnets of the serial number counter also passes through the normally closed side of contacts RSN3—10 through RSN3—12 to the stop magnets S4—S6 of the quantity counter. The quantity counter then, moves from 999 to 000 and stops.

The impulse a 13 time in the fourth cycle is also used to test the 9's contacts of the quantity counter. If all the orders of the quantity counter stand at 9, as they do, during the fourth cycle, then it becomes necessary to condition the read feed unit for operation during the fifth cycle. If the quantity counter did not stand at 999, then during the fifth cycle and all succeeding cycles only the punch feed unit would operate until such time as all the orders of the quantity counter reached 9.

It will be noticed that the 13 impulse which adds 1 to the quantity counter is also the test impulse, however, the counter wheel actually does not begin to move, after the magnet is energized, until after the test impulse is completed to energize relay RSN5. The test pulse passes from the normally closed side of contacts RSN3—6 (Fig. 11d), the closed contacts RSN2—5, 9's contacts in the unit order, contacts RSN3—3, 9's contacts in the tens order, contacts RSN3—4, 9's contacts in the hundredths order, RSN4—1, wire 420, contacts RSN9—2, transferred, contacts RSN11—1, transferred, closed contacts RSN2—11, the pick coil of relay RSN5 and line 401. With relay RSN5 energized, contacts RSN5—3 (Fig. 11a) close to operate the read feed unit in the fifth cycle. A parallel circuit is also completed from contacts RSN11—1 through contacts RSN10—6, now closed, the pick coil of relay R38 and line 401. As a result the contacts R38—1 through R38—4 transfer to make the fifth cycle a reproduce cycle similar to the first run-in cycle.

Fifth cycle

In the fifth cycle, the second master card of the first group ejects into the stacker, the trailer card of the first group passes the checking brushes 16, the first master card of the second group passes the read brushes 15 and the second master card advances out of the hopper R. Meanwhile, the second detail card passes the print station and receives the starting serial number 015 set up during the fourth cycle, the third detail card passes the punch brushes as the fourth detail card passes the punches but gang punching does not take place due to the transfer of the R38 contacts, and a fifth detail card advances out of the hopper P.

The printing of the starting serial number is done at 11 time during this cycle when a circuit is established through the platen magnets PLM which may be traced as follows: line 400 (Fig. 11*f*), contacts PC11, R87*b*, PC9, closing at 11 time, switch S9, contacts R89*b*, and the platen magnets PLM, to line 401. As previously explained, the energization of the platen magnets causes the platen to operate to print from the previously set type wheels.

During the fifth cycle the serial number 016 presently standing in the serial number must be transmitted to the print setup relays in order that it may be printed on the third detail card during the sixth cycle and also the serial number counter must be reset to 000 preparatory to receiving a new starting serial number for the next group. Preparatory to the above operation, relay RSN13 is energized at 14.4 time in the same manner as described in the second cycle of operation. As a result, contacts RSN13—3 through RSN13—5 in the serial number counter are closed to effect resetting of the counter as the number 016 is read out to set up the print mechanism. The closure of the above contacts connects the add magnets of the serial number counter to the terminals of the machine emitter which will emit a pulse for each cycle point of operation of the machine through wire 421 and cam contacts C23 and P1 (Fig. 11*b*). With the counter standing at 016 it can be understood that the "0" impulse from contacts C23 will pass through the "0" emitter spot, brush, the hundreds terminal, wire 422, normally closed side of contacts RSN7—4, contacts RSN13—5, now closed, add magnet A3 in the hundreds order and line 401. Consequently, the hundreds order counter wheel starts to turn. The circuit just traced will also extend through the hundreds order exit hub and will be transmitted by a plug wire connection to the entry hub PS7 for the third position of the print mechanism to set up the print wheels in the manner previously described. In similar fashion, the tens and units order counter wheels will be put into rotation by impulses at "1" and "6" time respectively and 16 will be set up in the second and first positions of the print mechanism.

At 7.5 time in the cycle relay RSN2 is energized through cam contacts P4 and the now closed contacts RSN13—2 and at 9.5 time a circuit is completed from line 400 (Fig. 11*c*), cam contacts C4, the pick coil of relay RSN16 and line 401. It should be mentioned also, that early in this cycle, at 14.3 time, a circuit was completed from line 400, cam contacts RSN5, normally closed contacts RSN15—2, the pick coil of relay RSN17 and line 401. Now at 13 time in the cycle, by which time all of the serial number counter wheels will have rolled to the "0" position, a circuit will be completed from line 400 (Fig. 11*e*), cam contacts P11, now closed contacts RSN10—5, RSN20—4, RSN13—12 (relay RSN13 drops out at 9.5 time through cam contacts R2), RSN9—4, RSN12—3, RSN2—9, RSN16—1 through RSN16—3, RSN17—1 through RSN17—3, now transferred, the stop magnets S1, S2, S3 and line 401. Thus, the counter wheels are stopped in the "0" position.

*Sixth cycle*

In the sixth cycle the serial number 016 will be printed on the third detail card and this will complete the serial number printing operations for the first group of master cards since the quantity number 002 called for only two detail cards to be serially number printed. The first and second master cards of the second group will reproduce on the fifth detail card and the machine will operate through another series of cycles in the manner described.

It can be appreciated that several novel circuit controls, centering particularly around the operation of relays R38, RSN19 and RSN20, have been added to the serial number printing machine of the class described for the purpose of successfully carrying out a new application for this type of machine.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, means to feed a succession of records, the first and second of said records having designations representing data to be reproduced and gang punched and the third of said records having designations representing a starting serial number and a quantity number, means to sense said designations one record at a time, perforating means for reproducing and gang punching a series of separate records in accordance with the designations on said first and second records, other sensing means for sensing said series of separate records, control means operated by a run-in cycle of operation of the machine for conditioning said perforating means for a reproducing type of operation under control of said first sensing means during the next two successive machine cycles of operation, means for operating said control means to condition said perforating means for a gang punching type of operation under control of said other sensing means during the next and succeeding cycles following said two reproducing cycles, a quantity counter under control of said first sensing means for receiving the quantity number, a serial number counter under control of said first sensing means for receiving the starting serial number, means to print a succession of said separate records under control of the serial number counter, means to advance both the serial number counter and the quantity counter a unit for each separate record printed, whereby the successive separate records are printed with different consecutive serial numbers, and means controlled by the quantity counter for terminating the printing of serial numbers when the number of separate records counted equals the quantity designated.

2. A machine as in claim 1 including means under control of said quantity counter when the number of records counted equals the quantity designated for operating said control means to again condition said perforating means for a reproducing type of operation during the next two successive machine cycles of operation.

3. In a machine of the class described, means to feed a succession of records, the first and second of said records having designations representing data to be reproduced and gang punched and the third of said records having designations representing a starting serial number and a quantity number, means to sense said designations one record at a time, perforating means for reproducing and gang punching a series of separate records in accordance with the designations on said first and second records, other sensing means for sensing said series of separate records, means for normally operating said record feed means for the first three cycles of machine operation, control means operated by the first run-in cycle of operation for conditioning said perforating means for a reproducing type of operation under control of said first sensing means during the next two successive machine cycles, second control means operated by the first run cycle of operation for causing said record feed means to take an extra cycle of operation immediately following said two reproducing cycles, means for operating said control means to condition said perforating means for a gang punching type of operation under control of said other sensing means during the next and succeeding cycles following said two reproducing cycles, a quantity counter under control of said first sensing means for receiving the quantity number, a serial number counter under control of said first sensing means for receiving the starting serial number, means to print a succession of said separate records under control of the serial number counter, means to advance both the serial number counter and the quantity counter a unit for each separate record printed, whereby the successive separate records are printed with different consecutive serial numbers, and means controlled by the quantity counter for terminating the printing of serial numbers when the number of separate records counted equals the quantity designated.

4. A machine as in claim 3 including means under control of said second control means for delaying by one cycle the normal entry of the quantity number and starting serial number into the quantity and serial number counters.

5. In a machine of the class described, means to feed a succession of records, the first and second of said records having designations representing data to be reproduced and gang punched and the third of said records having designations representing a starting serial number and a quantity number, means for simultaneously sensing said first and second records, perforating means for reproducing and gang punching a series of separate records in accordance with the designations on said first and second records, other sensing means for sensing said series of separate records, control means operated by a run-in cycle of operation of the machine for conditioning said perforating means to reproduce the designations from said first and second records during the third cycle of machine operation, means for operating said control means to condition said perforating means for a gang punching type of operation under control of said other sensing means during the fourth and succeeding cycles of machine operation, a quantity counter under control of said first sensing means for receiving the quantity number, a serial number counter under control of said first sensing means for receiving the starting serial number, means to print a succession of said separate records under control of the serial number counter, means to advance both the serial number counter and the quantity counter a unit for each separate record printed, whereby the successive separate records are printed with different consecutive serial numbers, and means controlled by the quantity counter for terminating the printing of serial numbers when the number of separate records counted equals the quantity designated.

6. In a machine of the class described for serial number printing groups of gang punched detail records, means to feed a succession of master records, the first and second of said master records having designations representing data to be reproduced and gang punched and the third master record having designations representing a starting serial number and a quantity number, means for simultaneously sensing said first and second records, perforating means for reproducing and gang punching a series of said detail records in accordance with the designations on said first and second records, other sensing means for sensing said series of detail records, control means operated by a run-in cycle of operation of the machine for conditioning said perforating means for a reproducing type of operation under control of said first sensing means during the second cycle of machine operation, means under control of said run-in cycle for operating said control means a second time to condition said perforating means to reproduce the designations from said first and second records during the third cycle of machine operation, and cyclically operable means for operating said control means to condition said perforating means for a gang punching type of operation under control of said other sensing means during the fourth and succeeding cycles of machine operation.

7. In a machine of the class described for serial number printing groups of gang punched detail records, means to feed a succession of master records, the first and second of said master records having designations representing data to be reproduced and gang punched and the third master record having designations representing a starting serial number and a quantity number, means for simultaneously sensing said first and second records, perforating means for reproducing and gang punching a series of said detail records in accordance with the designations on said first and second records, other sensing means for sensing said series of detail records, relay means operated by a run-in cycle of operation of the machine, switch means operated by said relay means for conditioning said perforating means for a reproducing type of operation under control of said first sensing means during the second cycle of machine operation, a second relay means under control of said first relay means and operable during the second cycle of machine operation for operating said switch means a second time to condition said perforating means to reproduce the designations from said first and second records during the third cycle of machine operation, and cyclically operable means for operating said switch means to condition said perforating means for a gang punching type of operation under control of said other sensing means during the fourth and succeeding cycles of machine operation.

8. In a machine of the class described for serial number printing groups of gang punched detail records, means to feed a succession of master records, the first and second of said master records having designations representing data to be reproduced and gang punched and the third master record having designations representing a starting serial number and a quantity number, means for simultaneously sensing said first and second records, perforating means for reproducing and gang punching a series of said detail records in accordance with the designations on said first and second records, other sensing means for sensing said series of detail records, means for normally operating said record feed means for the first three cycles of machine operation, relay means operated by a run-in cycle of operation of the machine, switch means operated by said relay means for conditioning said perforating means for a reproducing type of operation under control of said first sensing means during the second cycle of machine operation, a second relay means under control of said first relay means and operable during the second cycle of machine operation for operating said switch means a second time to condition said perforating means to reproduce the designations from said first and second records during the third cycle of machine operation, a third relay means under control of said first and second relay means for causing said record feed means to operate during the fourth cycle of machine operation, and cyclically operable means for operating said switch means to condition said perforating means for a gang punching type of operation under control of said other sensing means during the fourth and succeeding cycles of machine operation.

No references cited.